US012581518B2

(12) United States Patent
Zhang et al.

(10) Patent No.: US 12,581,518 B2
(45) Date of Patent: Mar. 17, 2026

(54) METHOD AND DEVICE FOR RESOURCE DETERMINATION

(71) Applicant: GUANGDONG OPPO MOBILE TELECOMMUNICATIONS CORP., LTD., Dongguan (CN)

(72) Inventors: Shichang Zhang, Dongguan (CN); Yi Ding, Dongguan (CN); Zhenshan Zhao, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 378 days.

(21) Appl. No.: 18/343,958

(22) Filed: Jun. 29, 2023

(65) Prior Publication Data

US 2023/0345510 A1 Oct. 26, 2023

Related U.S. Application Data

(63) Continuation of application No. PCT/CN2021/070185, filed on Jan. 4, 2021.

(51) Int. Cl.
*H04W 72/40* (2023.01)
*H04W 72/0453* (2023.01)

(52) U.S. Cl.
CPC ....... *H04W 72/40* (2023.01); *H04W 72/0453* (2013.01)

(58) Field of Classification Search
CPC .. H04W 72/40; H04W 72/0453; H04W 72/02
See application file for complete search history.

(56) References Cited

U.S. PATENT DOCUMENTS

| | | | | |
|---|---|---|---|---|
| 2018/0279259 A1* | 9/2018 | Gulati | .................. | H04L 5/0071 |
| 2020/0275411 A1 | 8/2020 | Tang | | |
| 2023/0171796 A1* | 6/2023 | Ji | ........................ | H04W 72/542 |
| | | | | 370/329 |
| 2025/0184966 A1* | 6/2025 | Jiang | ..................... | H04W 72/23 |

FOREIGN PATENT DOCUMENTS

| | | | | | |
|---|---|---|---|---|---|
| CN | 109565793 A | 4/2019 | | | |
| CN | 111148240 A | 5/2020 | | | |
| CN | 111836371 A | 10/2020 | | | |
| EP | 4250860 A1 * | 9/2023 | ............ | H04W 72/25 |
| JP | 2023545164 A * | 10/2023 | ............ | H04W 72/02 |

(Continued)

OTHER PUBLICATIONS

Intel Corporation. "Sidelink Resource Allocation Design for NR V2X Communication", 3GPP TSG RAN WG1 Meeting #96bis R1-1904296, Apr. 12, 2019 (Apr. 12, 2019), sections 2.1-2.8. 15 pages.

(Continued)

*Primary Examiner* — Kevin T Bates
*Assistant Examiner* — Poonam Sharma
(74) *Attorney, Agent, or Firm* — PERKINS COIE LLP

(57) ABSTRACT

A method for resource determination, including: receiving, by a first terminal, indication information indicating a reference resource set; determining a candidate resource set based on the reference resource set; and determining resources used for sending sidelink data based on the candidate resource set.

12 Claims, 12 Drawing Sheets

A first terminal receives indication information indicating a reference resource set — S301

The first terminal determines a candidate resource set based on the reference resource set — S302

The first terminal determines resources used for sending sidelink data based on the candidate resource set — S303

(56) References Cited

FOREIGN PATENT DOCUMENTS

WO          2019051782 A1      3/2019
WO          WO-2021212522 A1 *  10/2021   ........... H04W 72/02

OTHER PUBLICATIONS

International Search Report in the international application No. PCT/CN2021/070185, mailed on Sep. 28, 2021. 5 pages with English translation.
English translation of the Written Opinion of the International Search Authority in the international application No. PCT/CN2021/070185, mailed on Sep. 28, 2021. 6 pages with English translation.
Moderator (LG Electronics), "Feature lead summary for AI 8.11.2.2 Feasibility and benefits for mode 2 enhancements", #3GPP TSG RAN WG1 #103-e, R1-2009788, e-Meeting, Oct. 26-Nov. 13, 2020. 79 pages.
Huawei, HiSilicon, "Inter-UE coordination in sidelink resource allocation", 3GPP TSG RAN WG1 Meeting #103-e R1-2007616E-meeting, Oct. 26-Nov. 13, 2020.12pages.
Samsung, "On Feasibility and Benefits for Mode2 Enhancements", 3GPP TSG RAN WG1 #103-e R1-2008190, e-Meeting, Oct. 26-Nov. 13, 2020. 6 pages.
Ericsson, "Feasibility and benefits of mode 2 enhancements for inter-UE coordination", 3GPP TSG-RAN WG1 Meeting #103-e R1-2009073, e-Meeting, Aug. 17-28, 2020. 8 pages.
Qualcomm Incorporated, "Reliability and Latency Enhancements for Mode 2", 3GPP TSG RAN WG1 Meeting #103-e R1-2009273, Oct. 26-Nov. 13, 2020. 19 pages.
Vivo, "Discussion on mode 2 enhancements", 3GPP TSG RAN WG1 #103-e R1-2007689, e-Meeting, Oct. 26-Nov. 13, 2020. 8 pages.
LG Electronics, "Discussion on feasibility and benefits for mode 2 enhancement", 3GPP TSG RAN WG1 Meeting #103-e R1-2007896, e-Meeting, Oct. 26-Nov. 13, 2020. 26 pages.
"5G; NR; Physical layer procedures for data (3GPP TS 38.214 version 16.3.0 Release 16)", ETSI Technical Specification, European Telecommunications Standards Instiute(ETSI), 650, Route Des Lucioles ; F-06921Sophia-Antipolis ; France vol. 3GPP RAN, No. V16.3.0, Nov. 12, 2020 (Nov. 12, 2020), XP014389819, section 8.1.4;p. 153, 169 pages.
Supplementary European Search Report in the European application No. 21912428.6, mailed on Jan. 29, 2024, 12 pages.

* cited by examiner

First terminal           Second terminal

Communication group

| A first terminal receives indication information indicating a reference resource set | S301 |

| The first terminal determines a candidate resource set based on the reference resource set | S302 |

| The first terminal determines resources used for sending sidelink data based on the candidate resource set | S303 |

METHOD AND DEVICE FOR RESOURCE DETERMINATION

CROSS REFERENCE TO RELATED APPLICATION

This is a continuation of International Application No. PCT/CN2021/070185 filed on Jan. 4, 2021, the disclosure of which is hereby incorporated by reference in its entirety.

BACKGROUND

Vehicle to Everything (V2X) communication is a communication between a vehicle and anything outside of the vehicle. The V2X communication includes Vehicle to Vehicle (V2V) communication, Vehicle to Pedestrian (V2P) communication, Vehicle to Infrastructure (V2I) communication, and Vehicle to Network (V2N) communication. Device to Device (D2D) communication technology is a communication mode in which two peer-to-peer user nodes directly communicate with each other.

At present, in a V2X system or a D2D system, the reliability of sidelink data transmission between two terminals is low, and how to improve the reliability of the sidelink data transmission between two terminals is an urgent problem to be solved in the art.

SUMMARY

Embodiments of the present disclosure relate to, but are not limited to, Sidelink (SL) communication, and particularly to a method and device for resource determination.

In a first aspect, a method for resource determination is provided. The method includes: a first terminal receives indication information indicating a reference resource set; a candidate resource set is determined based on the reference resource set; and resources used for sending sidelink data are determined based on the candidate resource set.

In a second aspect, a method for resource determination is provided. The method includes: a second terminal sends indication information indicating a reference resource set to a first terminal. The reference resource set is used by the first terminal to determine a candidate resource set based on the reference resource set, and determine resources used for sending sidelink data based on the candidate resource set.

In a third aspect, a device for resource determination is provided. The device includes: a processor, and a memory storing a computer program executable by the processor. The processor is configured to execute the program to perform the method of the first aspect described above.

DETAILED DESCRIPTION

Figure 1A:
FIG. 1A is a schematic diagram of a unicast transmission mode between terminals according to an embodiment of the present disclosure.

The technical scheme of the present disclosure will be described in detail by way of embodiments and in conjunction with the accompanying drawings. The following specific embodiments may be combined with one another and may not be repeated in some embodiments for identical or similar concepts or processes. It should be noted that in the examples of the present disclosure, terms "first", "second" and the like are used for distinguishing similar objects and need not be used for describing a specific order or priority. In addition, the technical scheme described in the embodiments of the present disclosure can be arbitrarily combined without conflict. The plurality or multiple times in the embodiments of the present disclosure are to be understood as two or more or two or more times without particular description.

The first terminal or the second terminal in the present disclosure may be called as Terminal, User Equipment (UE), Mobile Station (MS), Mobile Terminal (MT), and the like. The terminal device herein can specifically be a mobile phone, a Pad, a computer with wireless transceiver function, a palmtop computer, a desktop computer, a personal digital assistant, a portable media player, a smart speaker, a navigation device, a smart watch, a smart glasses, a smart necklace and other wearable devices, a pedometer, a digital TV, a Virtual Reality (VR) terminal device, a Augmented Reality (AR) terminal device, a wireless terminal in industrial control, a wireless terminal in self driving, a wireless terminal in remote medical surgery, a wireless terminal in smart grid, a wireless terminal in transportation safety, a wireless terminal in smart city, a wireless terminal in smart home, and vehicles, on-board devices, on-board modules, wireless modem, handheld or Customer Premise Equipment (CPE) in vehicle networking systems. In other embodiments, the first terminal or the second terminal may also be an intelligent home appliance.

The network device in the embodiments of the present disclosure may include a Wireless-Fidelity (Wi-Fi) access point, an evolved base station or a next generation communication base station, such as a 5G gNB or small station, a micro station or a transmission reception point (TRP), and the network device may also include a relay station, an access point, etc.

The method for resource determination in the embodiments of the present disclosure can be applied to the current Long Term Evolution (LTE) system or the LTE Advanced (LTE-A) system, and can also be applied to the 5G network currently being formulated or other networks in the future, which is not specifically limited in the embodiments of the present disclosure. The terminals in the communication system may correspond to different names in different networks and it will be understood by those skilled in the art that the names do not define the device itself. For example, the method for resource determination can be applied to the V2X system or the D2D system. The V2X system may include a New Radio (NR) V2X system. In V2X, terminals can communicate with each other in two ways. In one of the ways, the terminals communicate with each other through Uu interface. That is to say, the communication between terminals requires forwarding of the nodes such as base stations. In the other way, the terminals can perform sidelink communication, i.e., the terminals can perform direct communication without the forwarding of the base stations. In this case, the link directly connecting terminals is called a as sidelink link.

According to a network coverage situation of the network where the terminal performing the communication is located, the sidelink communication can be divided into sidelink communication within network coverage, sidelink communication partly within network coverage, and sidelink communication outside network coverage.

In the NR-V2X, automatic driving needs to be supported, so higher requirements are put forward for data interaction between vehicles, such as higher throughput, lower delay, higher reliability, larger coverage and more flexible resource allocation.

In LTE-V2X, the broadcast transmission mode can be supported, and in NR-V2X, the unicast and the multicast transmission modes can be introduced.

FIG. 1A is a schematic diagram of a unicast transmission mode between terminals according to an embodiment of the present disclosure. As shown in FIG. 1A, in the unicast transmission, the receiving end has one terminal, for example, the first terminal and the second terminal can communicate with each other in a single direction.

Figure 1B:
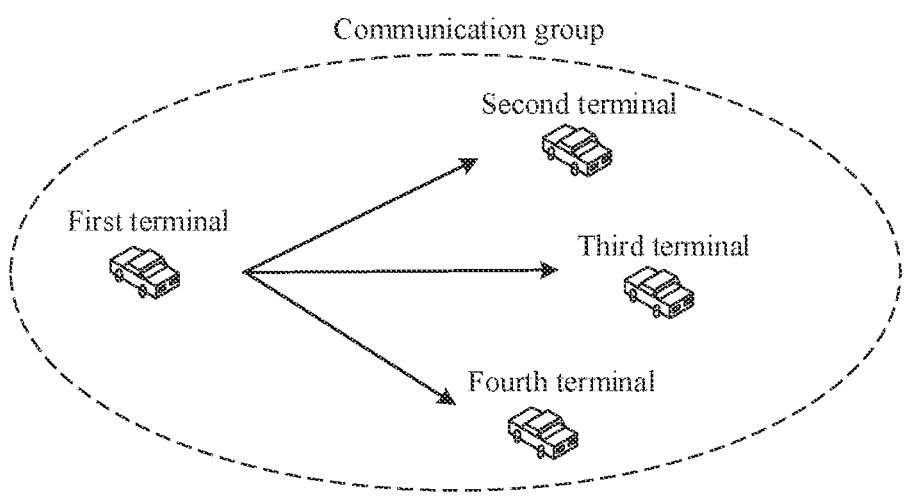
FIG. 1B is a schematic diagram of a multicast transmission mode between terminals according to an embodiment of the present disclosure.

FIG. 1B is a schematic diagram of a multicast transmission mode between terminals according to an embodiment of the present disclosure. As shown in FIG. 1B, in the multicast transmission, the receiving end has all terminals in a communication group or all terminals within a certain transmission distance. For example, a first terminal can send sidelink data to a second terminal, a third terminal and a fourth terminal that are all in a communication group.

Figure 1C:
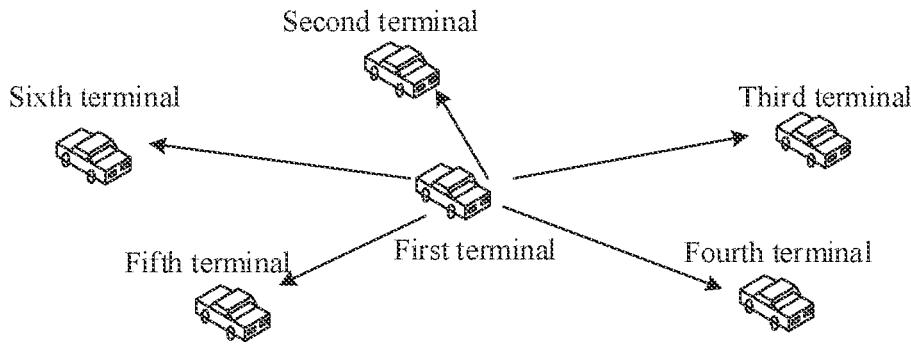
FIG. 1C is a schematic diagram of a broadcast transmission mode between terminals according to an embodiment of the present disclosure.

FIG. 1C is a schematic diagram of a broadcast transmission mode between terminals according to an embodiment of the present disclosure. As shown in FIG. 1C, in the broadcast transmission mode, the receiving end has any one of terminals around a terminal at the sending end. For example, a first terminal is a terminal at the sending end, and other terminals around the first terminal, i.e., the second terminal to the sixth terminal are all terminals at the receiving end.

Figures 1D, 1E, 1F:
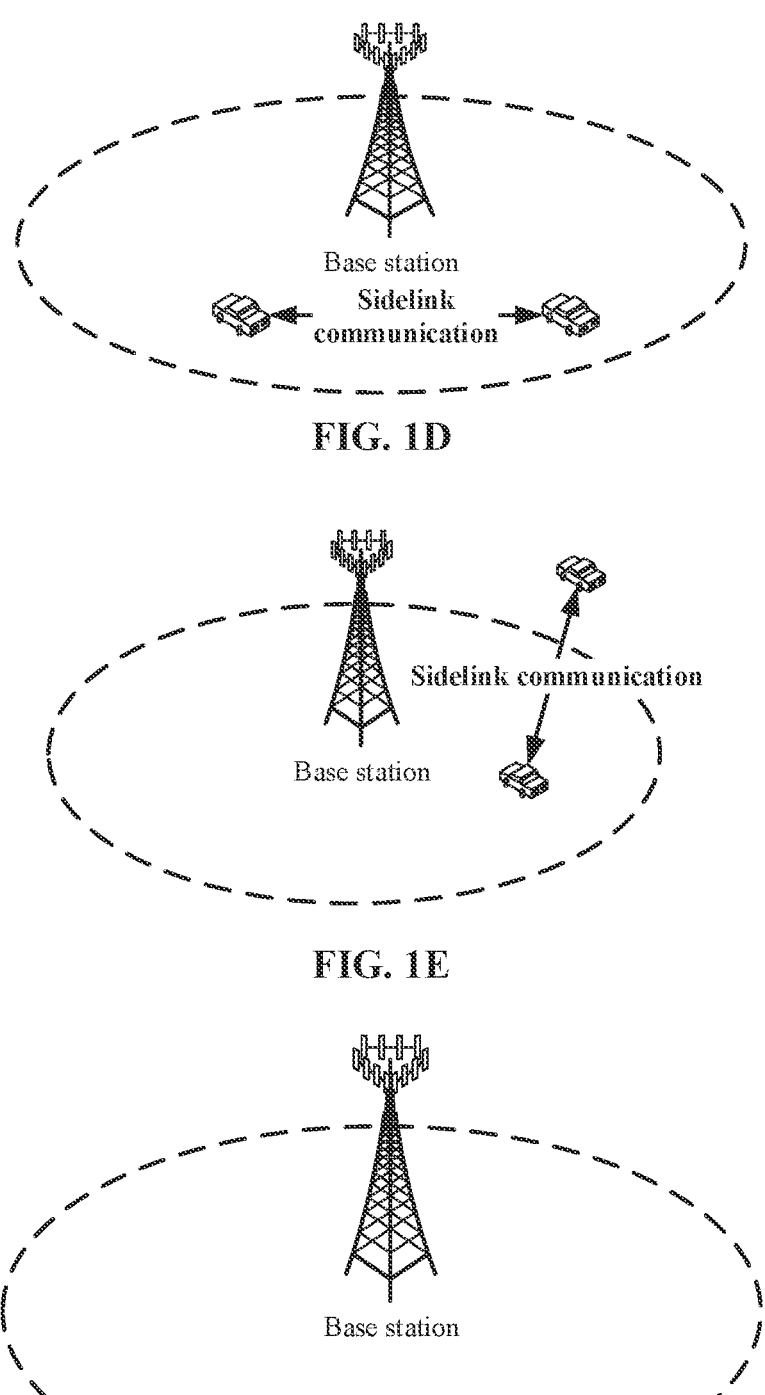
FIG. 1D is a schematic diagram of all terminals performing sidelink communication being located within network coverage according to an embodiment of the present disclosure.
FIG. 1E is a schematic diagram of a part of terminals performing sidelink communication being located within network coverage according to an embodiment of the present disclosure.
FIG. 1F is a schematic diagram of all terminals performing sidelink communication being located outside network coverage according to an embodiment of the present disclosure.

FIG. 1D is a schematic diagram of all terminals performing sidelink communication being located within network coverage according to an embodiment of the present disclosure. As shown in FIG. 1D, in the sidelink communication within network coverage, all terminals within the coverage of the same base station can perform sidelink communication based on the same sidelink configuration by receiving configuration information from the base station.

The term "within network coverage" in the embodiments of the present disclosure can be within coverage corresponding to a network device.

FIG. 1E is a schematic diagram of a part of terminals performing sidelink communication being located within network coverage according to an embodiment of the present disclosure. As shown in FIG. 1E, in the sidelink communication partly within the network coverage, the terminals within the network coverage can receive the configuration information from the base station and perform sidelink communication according to the configuration from the base station. The terminals outside the network coverage cannot receive the configuration information from the base station. In this case, the terminal outside the network coverage determines sidelink configuration information based on pre-configuration information and information carried in Physical Sidelink Broadcast Channel (PSBCH) sent by the terminal within the network coverage, thereby performing the sidelink communication.

FIG. 1F is a schematic diagram of all terminals performing sidelink communication being located outside network coverage according to an embodiment of the present disclosure. As shown in FIG. 1F, in the sidelink communication outside the network coverage, all terminals can determine sidelink configuration according to pre-configuration information to perform the sidelink communication.

A D2D-based sidelink transmission technology has a manner for receiving and sending communication data through base stations different from that in traditional cellular system. D2D communication has higher spectrum efficiency and lower transmission delay. The V2X system adopts a way of D2D direct communication, and defines two resource selection modes in 3GPP: the first resource selection mode and the second resource selection mode.

In the first resource selection mode, transmission resources of a terminal may be allocated by a base station, and the terminal may send sidelink data on a sidelink link according to the resources allocated by the base station. The base station can allocate resources for single transmission or resources for semi-static transmission for the terminal. As shown in FIG. 1D and FIG. 1E, for the terminal within the network coverage, the network may allocate transmission resources for sidelink transmission for the terminal.

In the second resource selection mode, the terminal can select a resource in a resource pool to transmit data. As shown in FIG. 1E and FIG. 1F, for the terminal outside the network coverage, the terminal is located outside cell coverage, and the terminal can autonomously select transmission resources in a pre-configured resource pool to perform the sidelink transmission. Optionally, as shown in FIG. 1D and FIG. 1E, for the terminal within the network coverage, the terminal can autonomously select transmission resources in a resource pool configured by the network to perform sidelink transmission. In the second resource selection mode, a physical layer of the terminal can exclude resources unsuitable for the sidelink transmission from the resource selection window according to a channel listening result; determine the candidate resource set based on the resources unsuitable for the sidelink transmission, and report the candidate resource set to a Media Access Control (MAC) layer of the terminal. The MAC layer may then select resources from the reported candidate resource set to transmit sidelink data.

In a case where resources used for sending the sidelink data are determined through the second resource selection mode, the terminal can randomly select the transmission resources in the pre-configured resource pool or the resource pool configured by the network. For example, the transmission resources can be selected according to the listening result. However, those skilled find that the following three problems will exist when the resources used for sending the sidelink data are determined through the second resource selection mode.

Figures 2A, 2B, 3:
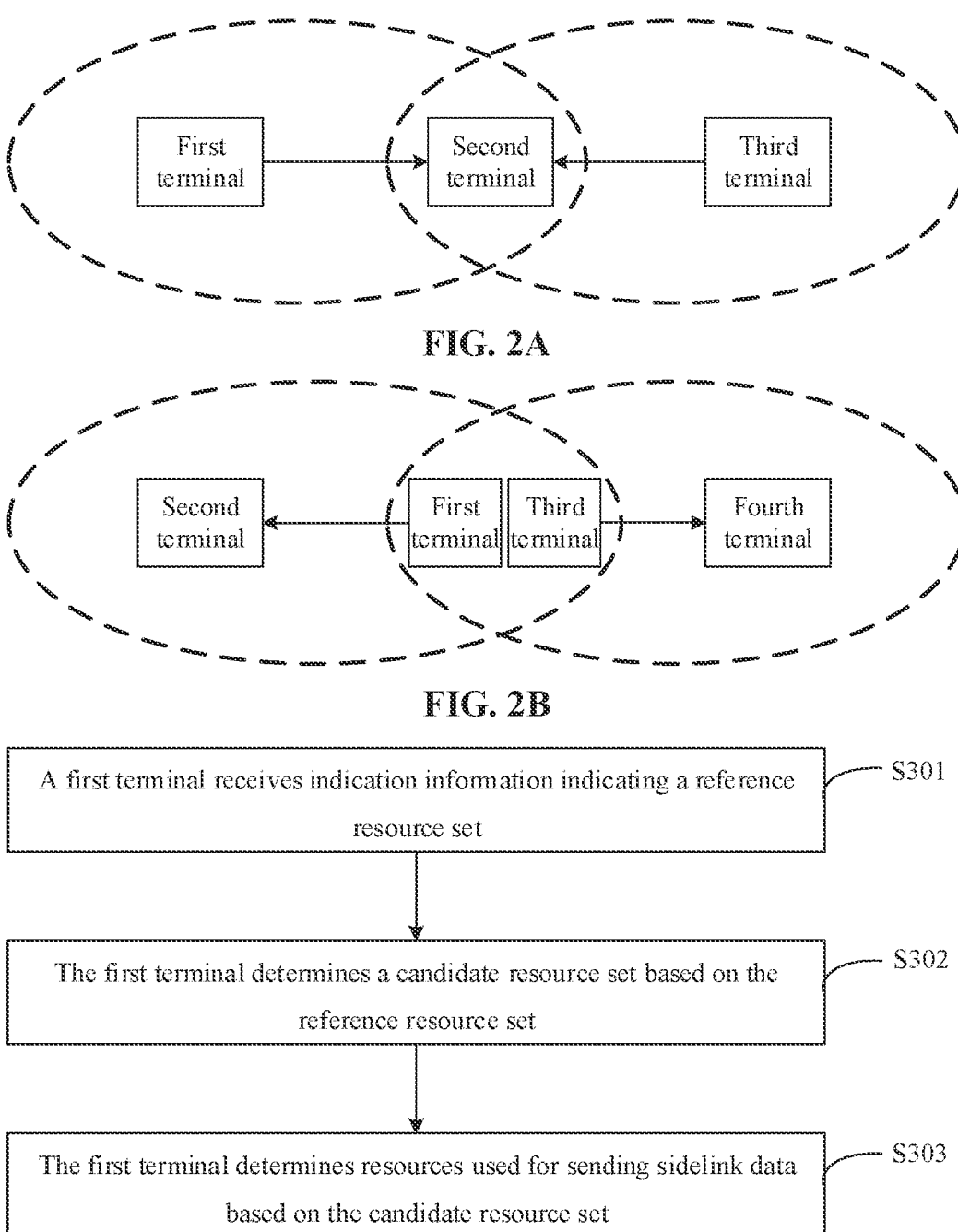
FIG. 2A is a schematic diagram of positions of terminals performing sidelink communication according to an embodiment of the present disclosure.
FIG. 2B is another schematic diagram of positions of terminals performing sidelink communication according to an embodiment of the present disclosure.
FIG. 3 is a flowchart of a method for resource determination according to an embodiment of the present disclosure.

Firstly, FIG. 2A is a schematic diagram of positions of terminals performing sidelink communication according to an embodiment of the present disclosure. As shown in FIG. 2A, a first terminal and a second terminal can detect each other's transmissions, and a second terminal and a third terminal can detect each other's transmissions. If the first terminal selects resources used for sending sidelink data according to listening and sends sidelink data by using the resources. However, the first terminal and the third terminal are far away from each other and cannot detect each other's transmissions. In this case, the first terminal and the third terminal may select the same or overlapping transmission resources, and the transmission of the sidelink data from the third terminal may cause interference to the transmission of the sidelink data of the first terminal.

Secondly, in a case where the terminal selects the transmission resources through listening, in the listening window, if the terminal sends sidelink data on a certain slot, due to the limitation of half-duplex, the terminal cannot receive data sent by other terminals on the slot and has no listening result. Therefore, when the terminal performs resource exclusion, all the resources corresponding to the slot in the selection window will be excluded to avoid interference from other terminals. Therefore, due to the limitation of half duplex, the terminal excludes many resources that do not need to be excluded.

Again, FIG. 2B is another schematic diagram of positions of terminals performing sidelink communication according to an embodiment of the present disclosure. As shown in FIG. 2B, the first terminal and the second terminal can detect each other's transmissions, the first terminal and the third terminal can detect each other's transmissions, and the third terminal and the fourth terminal can detect each other's transmissions. The first terminal and the third terminal are both configured to send the sidelink data, and the second terminal and the fourth terminal are both used configured to receive the sidelink data. However, since the second terminal is far away from the third terminal and the fourth terminal is far away from the first terminal, in this case, even if the first terminal and the second terminal use the same time-frequency resources, the reception of their respective target receiving terminals will not be affected. However, since the first terminal is located in a geographical position close to that of the second terminal, the signal received power for listening each other during the listening process may be very high, so both the first terminal and the second terminal will choose orthogonal time-frequency resources, which may eventually lead to the decline of resource utilization efficiency.

Finally, in a case where resources used for sending the sidelink data are determined by using the second resource selection mode, it is necessary for the terminal to continuously listen for resources to determine which resources are available, and a lot of energy will be consumed to continuously listen for the resources. For the terminal, excessive energy consumption will lead to repaid power loss of the terminal, thus affecting the use of users. Therefore, how to reduce the energy consumption of the terminal is also a problem that needs to be considered in the process of resource selection.

Based on at least one of the above problems, the embodiments of the present disclosure provide a method for resource determination.

FIG. 3 is a flowchart of a method for resource determination according to an embodiment of the present disclosure. As shown in FIG. 3, the method includes operations S301 to S303.

In operation S301, a first terminal receives indication information indicating a reference resource set.

In some embodiments, the first terminal may receive indication information sent by the second terminal. In other embodiments, the first terminal may receive indication information sent by the network device.

The indication information may be called as reference resource set indication information. The indication information may be high-layer information or physical layer information in a sidelink communication system. The high-layer information described in any of the embodiments of the present disclosure may include MAC layer information. The indication information may be separate information or may be carried in other information sent by the second terminal or the network device to the first terminal.

The reference resource set may be used for assisting the first terminal in resource selection.

In some embodiments, the reference resource set may include: a resource set suitable for use of the first terminal or a resource set unsuitable for the use of the first terminal. In other embodiments, the reference resource set may include: a resource set suitable for the use of the first terminal or a resource set unsuitable for the use of the first terminal in resources that have been instructed to be reserved through Sidelink Control Information (SCI). In still other embodiments, the reference resource set may include: a resource set suitable for the use of the first terminal or a resource set unsuitable for the use of the first terminal in the resources that have been pre-selected but not yet been instructed to be reserved through the SCI. In still other embodiments, the reference resource set may include: a resource set that has been used by the first terminal and that has experienced a resource collision or has a limitation of the half duplex.

The indication information may include or indicate at least one of time domain information of the reference resource set or frequency domain information of the reference resource set. Therefore, the first terminal may determine a reference resource set within a range of at least one of the time domain information or the frequency domain information based on at least one of the time domain information or the frequency domain information.

The reference resource set indicated by the indication information may be at least one of: a resource set that is continuous or discontinuous in the time domain, or a resource set that is continuous or discontinuous in the frequency domain. For example, in some embodiments, the reference resource set indicated by the indication information may be a resource set that is continuous in both the time domain and the frequency domain. In other embodiments, the reference resource set indicated by the indication information may be a resource set that is discontinuous in at least one of the time domain and the frequency domain.

In operations S302, the first terminal determines a candidate resource set based on the reference resource set.

In some implementations, the candidate resource set may be selected from the reference resource set. In this case, the candidate resource set is included in the reference resource set, i.e. the operation that the candidate resource set is determined based on the reference resource set may include: the candidate resource set is selected from the reference resource set. In other embodiments, the candidate resource set may be partly selected from the reference resource set. In this case, the candidate resource set partially overlaps with the reference resource set. In still other embodiments, the determined candidate resource set may not be selected from the reference resource set. In this case, an intersection of the reference resource set and the candidate resource set is an empty set.

In some implementations, the candidate resource set may be a subset of the reference resource set. In other implementations, the reference resource set partially overlaps with the candidate resource set. In still other implementations, the reference resource set may be a subset of the candidate resource set.

In operation S303, the first terminal determines resources used for sending sidelink data based on the candidate resource set.

The sidelink data may include at least one of sidelink control information or sidelink data information. The sidelink control information can be the SCI. At least one of the sidelink control information or the sidelink data information may be information sent by the first terminal to the second terminal or the network device.

In some implementations, the resources used for sending the sidelink data may be selected from the candidate resource set. In this case, the resources used for sending the sidelink data are included in the candidate resource set, i.e. the operation that the resources used for sending the sidelink data are determined based on the candidate resource set may include: the resources used for sending the sidelink data are selected from the candidate resource set. In other implementations, the resources used for sending the sidelink data may be partially selected from the candidate resource set. In this case, the resources used for sending the sidelink data partially overlap with the candidate resource set. In still other embodiments, the determined resources used for sending the sidelink data may not be selected from the reference resource set. In this case, the intersection of the candidate resource set and the resources used for sending the sidelink data is an empty set.

In some implementations, the resources used for sending the sidelink data may be a subset of the candidate resource set. In other implementations, the reference resource set partially overlap with the resources used for sending the sidelink data. In still other implementations, the candidate resource set may be a subset of the resources used for sending the sidelink data.

In the embodiments of the present disclosure, since the first terminal receives the indication information indicating the reference resource set, the first terminal determines the candidate resource set based on the reference resource set, and resources used for sending sidelink data are determined based on the candidate resource set. In this way, when selecting the resources used for sending the sidelink data, the first terminal can determine the resources used for sending the sidelink data based on the indicated reference resource set, so that the reliability of the sidelink data transmission can be improved.

In addition, if the second terminal or the network device also performs sidelink communication with the third terminal, the second terminal or network device may indicate, to the first terminal, a reference resource set capable of avoiding interference from the sidelink data sent by the third terminal. Thus, when the first terminal selects resources used for sending the sidelink data from the reference resource set, interference caused by the transmission of the sidelink data form the third terminal to the transmission of the sidelink data form the first terminal can be avoided.

In some implementations, a resource pool used for determining the reference resource set is identical to a resource pool used for determining the candidate resource set. The resource pool may be a resource set that is continuous or discontinuous in the time domain and/or frequency domain. A length in time domain of the resource pool may be greater than or equal to a length in time domain of an union between the reference resource set and the candidate resource set, and/or a length in frequency domain of the resource pool may be greater than or equal to a length in frequency domain of the union between the reference resource set and the candidate resource set.

In some embodiments, the operation that the first terminal receives the indication information includes: the first terminal receives the indication information sent by the second terminal or the network device. The method may further include: the first terminal sends first high-layer information or first physical layer information to the second terminal or the network device. The first high-layer information or the first physical layer information indicates at least one of: a size in frequency domain of resources included in the reference resource set, or configuration information of the resource pool used for determining the reference resource set. In some implementations, the second terminal or network device may receive the first high-layer information or the first physical layer information sent by the first terminal, therefore, the second terminal or network device may determine at least one of the size in frequency domain of resources included in the reference resource set, or the configuration information of the resource pool used for determining the reference resource set based on the first high-layer information or the first physical layer information, thereby determining the reference resource set.

In any embodiment of the present disclosure, the resources included in the reference resource set may be all the resources included in the reference resource set.

In this manner, the first terminal may send the first high-layer information or the first physical layer information to the second terminal or network device, such that the second terminal or network device may determine an indicated reference resource set based on the first high-layer information or the first physical layer information.

In some embodiments, a physical layer of the first terminal receives the indication information sent by the second terminal or network device. The physical layer of the first terminal determines the candidate resource set based on the reference resource set. The method further includes: the physical layer reports the candidate resource set to the MAC layer of the first terminal; and the MAC layer determines the resources used for sending the sidelink data based on the candidate resource set.

In such implementation, the indication information may be physical layer information, so that the physical layer of the first terminal may determine the reference resource set based on the received physical layer information.

In other embodiments, the method further includes: the physical layer of the first terminal determines a first resource set, and uploads the first resource set to the MAC layer of the first terminal; the MAC layer determines the candidate resource set based on the reference resource set and the first resource set; and the MAC layer determines the resources used for sending the sidelink data based on the candidate resource set.

The indication information may be physical layer information. In some implementations, the physical layer of the first terminal can receive the indication information sent by the second terminal or the network device, and report the indication information to the MAC layer of the first terminal. The physical layer may determine a first resource set based on the reference resource set indicated by the indication information, and report the first resource set to the MAC layer, so that the MAC layer of the first terminal may receive the indication information, and determine the candidate resource set based on the reference resource set indicated by the indication information and the first resource set reported by the physical layer. The indication information may also be MAC layer information. The MAC layer of the first terminal may receive the indication information sent by the second terminal or the network device, so that the MAC layer of the first terminal may determine the reference resource set based on the reference resource set indicated by the indication information and the first resource set reported by the physical layer.

In some implementations, the reference resource set may include resources suitable for the first terminal to send the sidelink data. In this implementation, resources included in the reference resource set and resources included in the candidate resource set have a same size in frequency domain. Since the reference resource set includes resources suitable for the first terminal to send the sidelink data, the first terminal can preferentially select resources used for sending the sidelink data from the reference resource set, thereby improving the reliability of the sidelink data transmission.

In other implementations, the reference resource set includes resources unsuitable for the first terminal to send the sidelink data. In this implementation, a size in frequency domain of the resources included in the reference resource set is one or more sub-channels; and resources included in the reference resource set and resources included in the candidate resource set have a same or different size in frequency domain.

The embodiments corresponding to FIG. 4 to FIG. 9 illustrate the method for resource determination of the embodiments of the present disclosure by taking the reference resource set including resources suitable for the first terminal to send the sidelink data as an example.

Figure 4:
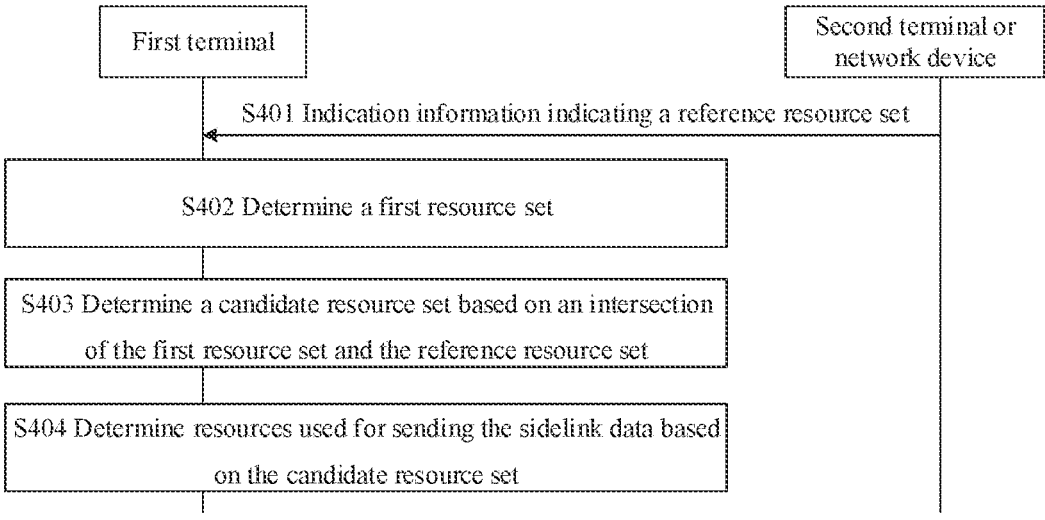
FIG. 4 is a flowchart of another method for resource determination according to an embodiment of the present disclosure.

FIG. 4 is a flowchart of another method for resource determination according to an embodiment of the present disclosure. As shown in FIG. 4, the method includes operations S401 to S404.

In operation S401, the second terminal or the network device sends the indication information to the first terminal, and the first terminal receives the indication information sent by the second terminal or the network device. The indication information indicates a reference resource set.

In operation S402, the first terminal determines a first resource set.

In some implementations, the first terminal may determine the first resource set based on the second resource selection mode. In some implementations, the first resource set may be a resource set selected by the first terminal from a pre-configured resource pool or a resource pool configured by the network.

In operation S403, the first terminal determines a candidate resource set based on an intersection of the first resource set and the reference resource set.

In this implementation, the candidate resource set is determined based on the intersection of the first resource set determined by the first terminal and the reference resource set. For example, the candidate resource set may be a common subset between the first resource set and the reference resource set.

In some implementations, the embodiments corresponding to FIG. 4 may conform to a case where the physical layer of the first terminal determines the candidate resource set based on the reference resource set. For example, the physical layer of the first terminal may determine the first resource set, and the physical layer of the first terminal may determine the candidate resource set based on the first resource set and the reference resource set, and upload the candidate resource set to the MAC layer. The embodiments corresponding to FIG. 4 can also conform to a case where the physical layer of the first terminal determines a first resource set and uploads the first resource set to the MAC layer of the first terminal, and the MAC layer determines the candidate resource set based on the reference resource set and the first resource set.

In some implementations, the operation that the first terminal receives the indication information includes: the first terminal receives the indication information sent by the second terminal or a network device. The number of resources included in the reference resource set may be greater than or equal to a product of the first value $M'_{total}$ and the second value Y1. The number of resources included in the reference resource set may be determined by the second terminal or network device. The first value M'total is the total number of resources in the resource selection window used by the second terminal or network device to determine the reference resource set.

The second value Y1 is greater than 0 and less than or equal to 1. The second value Y1 is determined by one of: a fixed setting, a network configuration, or a pre-configuration; by an indication of the first terminal, from one or more target values through second high-layer information or second physical layer information. The one or more target values are determined by a fixed setting, a network configuration or a pre-configuration.

In a feasible implementation, after the first terminal receives the indication information sent by the second terminal or the network device, the first terminal may send information used for feeding back the indication information to the second terminal or the network device, and indicate the second value Y1 through the information used for feeding back the indication information. For example, the second value Y1 may be 0.3, 0.5, 0.8, or 1.

It should be noted that values set by the fixed setting in any embodiment of the present disclosure may be values defined in the standard.

In one feasible implementation, the resource selection window used for determining the reference resource set is identical to the resource selection window used for determining the first resource set.

A resource set in a resource selection window used for determining the reference resource set may be a subset of a resource set in a resource pool used for determining the reference resource set. For example, the length in time domain and/or length in frequency domain of the resource selection window used for determining the reference resource set may be less than or equal to the length time domain and/or length in frequency domain of the resource pool used for determining the reference resource set.

In one implementation, before the first terminal receives the indication information sent by the second terminal or network device, the first terminal may send third high-layer information or third physical layer information to the second terminal or network device. The third high-layer information or the third physical layer information indicates a time starting position of the resource selection window used for determining the reference resource set. Therefore, the second terminal or network device may receive the third high-layer information or the third physical layer information sent by the first terminal, and may determine the time starting position of the resource selection window used for determining the reference resource set based on the third high-layer information or the third physical layer information, thereby determining the reference resource set.

In some implementations, the first value $M'_{total}$ may be identical to the initial number $M_{total}$ of resources in an available resource set of the resource pool used by the first terminal.

In another implementation, the resource selection window used for determining the reference resource set is determined by the second terminal or the network device based on at least one of: a time at which trigger information sent by the first terminal is received, or specific information included in the trigger information. The specific information included in the trigger information may include information for determining a resource selection window of the reference resource set. For example, information of position in time-frequency used for determining a resource selection window of the reference resource set, etc. The second terminal or network device can receive the trigger information sent by the first terminal. The resource selection window used for determining the reference resource set is determined based on a received time at which trigger information sent by the first terminal is received, or specific information included in the trigger information. The trigger information can be physical layer information or high-layer information.

In some implementations, the first value $M'_{total}$ differs from the initial number $M_{total}$ of resources in the available resource set of the resource pool used by the first terminal.

In any implementation of the present disclosure, any two of the first high-layer information/first physical layer information, the second high-layer information/second physical layer information, the third high-layer information/third physical layer information, or the trigger information may be the same message or different messages. For the different messages, the different messages can be signaling separating from each other, or can be carried in different signaling, or can be carried in the same signaling.

In some embodiments, the method may further include: in a case where the intersection of the first resource set and the reference resource set is greater than or equal to a first threshold, the intersection of the first resource set and the reference resource set is taken as the candidate resource set.

The first threshold is a product of an initial number $M_{total}$ of resources in an available resource set of a resource pool used by the first terminal and a third value X, the third value is greater than 0 and less than or equal to 1, and the third value X is determined by the first terminal from a first value set based on a priority for sending the sidelink data.

In some feasible embodiments, the method further includes: in a case where the intersection of the first resource set and the reference resource set is less than the first threshold, a first Reference Signal Received Power (RSRP) threshold used for determining the first resource set is raised to a second RSRP threshold; a second resource set AA is determined based on the second RSRP threshold; and in a case where an intersection of the second resource set AA and the reference resource set is greater than or equal to the first threshold, the intersection of the second resource set AA and the reference resource set is taken as the candidate resource set. The RSRP in any embodiment of the present disclosure may include Sidelink Reference Signal Received Power (S-RSRP). In the embodiments of the present disclosure, the operation that the first threshold is raised to a second RSRP threshold may include: the first RSRP threshold is raised by 3 dB to obtain the second RSRP threshold.

In the implementation, in the case where the intersection of the second resource set AA and the reference resource set is less than the first threshold, the second RSRP threshold is raised by 3 dB until the intersection of the resource set determined based on the obtained RSRP threshold and the reference resource set is greater than or equal to the first threshold, and the intersection is taken as the candidate resource set.

In operation S404, the first terminal determines resources used for sending the sidelink data based on the candidate resource set.

In the embodiments corresponding to FIG. 4, resources included in the reference resource set, resources included in the candidate resource set, and resources included in the first resource set have a same size in frequency domain.

In the embodiments of the present disclosure, since the first resource set is a set determined by the first terminal that is suitable for the first terminal to send sidelink data, and the reference resource set includes resources determined by the second terminal or the network device that is suitable for the first terminal to send the sidelink data, so that the candidate resource set is determined based on the intersection of the first resource set and the reference resource set, which can not only satisfies the requirements for the first terminal to send the sidelink data, but also satisfies the requirements for the second terminal or network device to receive the sidelink data, thereby improving the transmission reliability of the sidelink data.

A method for selecting resources from a specific resource selection window by using a second resource selection mode in an embodiment of the present disclosure is described below.

In some embodiments, the first terminal may determine the selected resource set by determining an eighth resource set and a ninth resource set; and taking an intersection of the eighth resource set and the ninth resource set as the selected resource set.

The eighth resource set is determined based on a third target slot at which data is transmitted within a listening window and no listening is performed, and the ninth resource set is determined based on a detected Physical Sidelink Control Channel (PSCCH). In the implementation, the first terminal can determine the slot in the specific resource selection window based on the third target slot and the value set of the resource reservation period field configured by the resource pool used by the first terminal.

In some implementations, the operation that the eighth resource set is determined may include: in a case where the data is sent at the third target slot in the listening window and no listening is performed at the third target slot, resources corresponding to the third target slot are excluded from a specific resource selection window to obtain the eighth resource set.

In some implementations, the operation that the resources corresponding to the third target slot are excluded from the target resource selection window may include: in the specific resource selection window, a fourth target slot corresponding to the third target slot is determined based on a resource reservation period; and all resources in the fourth target slot are determined. The resources in the fourth target slot may include all the frequency resources in the fourth target slot.

In some implementations, the operation that a ninth resource set is determined may include: in a case where the intersection of the fifth remaining resources and the eighth resource set is less than the product of the available resource set and the sixth value, the first RSRP threshold is raised to a second RSRP threshold; in a case where the RSRP of the PSCCH or the RSRP of the PSSCH scheduled by the PSCCH is greater than the second RSRP threshold and the periodic resource reservation is activated for the reserved resource in the target resource selection window or in the resource pool used by the first terminal, the reserved resource is excluded from the target resource selection window to obtain sixth remaining resources; and in a case where an intersection of the sixth remaining resources and the eighth resource set is greater than or equal to a product of the available resource set and the sixth value, the sixth remaining resources are taken as the ninth resource set. The sixth value can have a value between 0.2 and 1. For example, the sixth value can be determined from the value set {0.2, 0.35, 0.5, 1}. The first terminal may determine the value from the value set based on the priority for sending the sidelink data. A value of the first RSRP threshold can be determined based on at least one of the priority carried in the PSCCH detected by the first terminal or the priority for the first terminal to send the sidelink data.

In some embodiments, the method further includes: in a case where the intersection of the fifth remaining resources and the eighth resource set is less than the product of the available resource set and the sixth value, the first RSRP threshold is raised to a second RSRP threshold; in a case where the RSRP of the PSCCH or the RSRP of the PSSCH scheduled by the PSCCH is greater than the second RSRP threshold and the periodic resource reservation is activated for the reserved resource in the specific resource selection window or in the resource pool used by the first terminal, the reserved resource is excluded from the specific resource selection window to obtain sixth remaining resources; and in a case where an intersection of the sixth remaining resources and the eighth resource set is greater than or equal to a product of the available resource set and the sixth value, the sixth remaining resources are taken as the ninth resource set.

Figure 5:
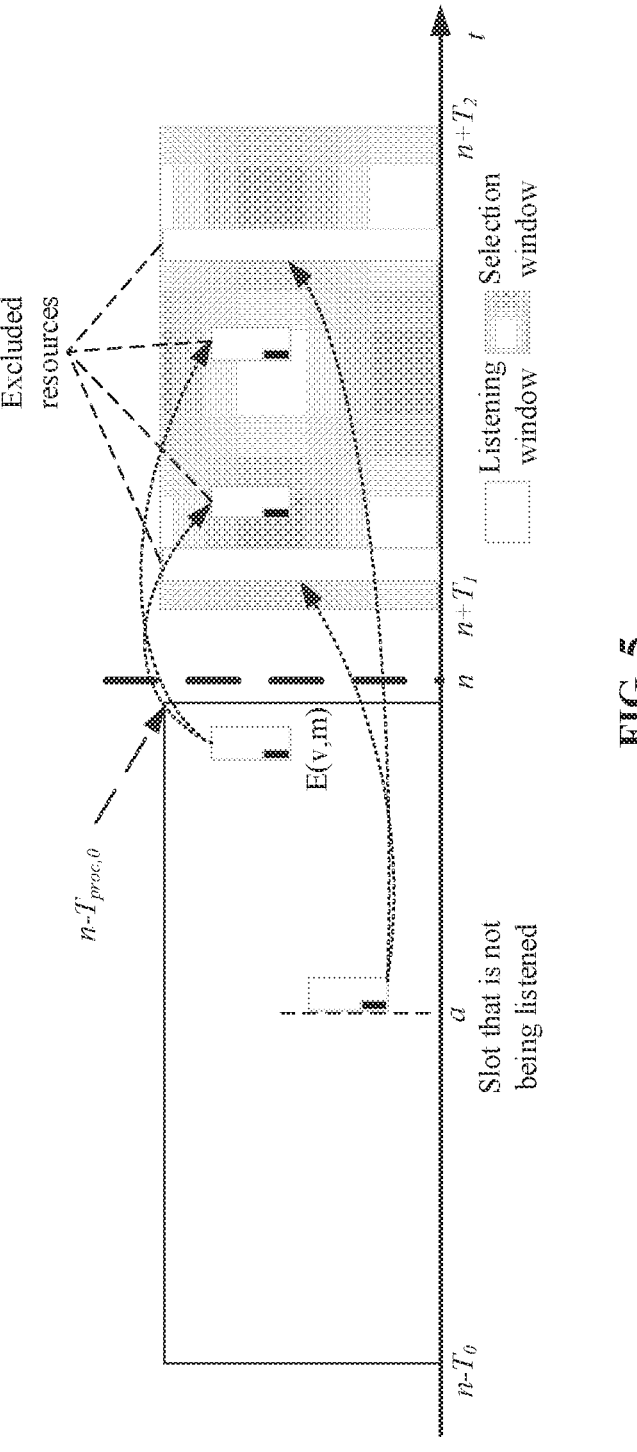
FIG. 5 is a schematic diagram of determining a selected resource set according to an embodiment of the present disclosure.

FIG. 5 is a schematic diagram of determining a selected resource set according to an embodiment of the present disclosure. As shown in FIG. 5, the first terminal triggers a resource selection or a resource reselection in slot n, and the specific resource selection window starts from n+T1 and ends at n+T2. $0<=T1<=T_{proc,1}$, where a value of $T_{proc,1}$ is associated with a subcarrier spacing of the first terminal. In a case where values of the subcarrier spacing are 15 kHz, 30 kHz, 60 kHz and 120 kHz respectively, the values of $T_{proc,1}$ can be 3 slots, 5 slots, 9 slots and 17 slots respectively. T2 is greater than or equal to T2 min and T2 is less than or equal to a residual delay budget of service. A value set of $T2_{min}$, may include slots selected from the set $\{1\times2^{\mu}, 5\times2^{\mu}, 10\times2^{\mu}, 20\times2^{\mu}\}$. In a case where the values of the subcarrier spacing are 15 kHz, 30 kHz, 60 kHz and 120 kHz respectively, the values of $\mu$ may be 0, 1, 2, 3, respectively. The first terminal may determine, according to the priority for the first terminal to send the sidelink data, $T2_{min}$ from the value set $\{1\times2^{\mu}, 5\times2^{\mu}, 10\times2^{\mu}, 20\times2^{\mu}\}$. [n+T1, n+T2] is called the specific resource selection window.

The first terminal can perform resource listening between $n-T0$ to $n-T_{proc,0}$, and the value of T0 is 100 or 1100 milliseconds. When the values of the subcarrier spacing are 15 kHz, 30 kHz, 60 kHz and 120 kHz, respectively, the values of $T_{proc,0}$ can be 1 slot, 1 slot, 2 slots and 4 slots respectively. [$n-T0$ to $n-T_{proc,0}$] is called a listening window or a resource listening window.

The physical layer of the first terminal may exclude, according to the channel listening result, resources unsuitable for sidelink transmission from a specific resource selection window.

The first terminal takes all available resources belonging to the resource pool used by the first terminal in the specific resource selection window as a target resource set. Any resource in the target resource set can be recorded as R (x,y), where x indicates a position in frequency domain of the resource and y indicates a position in time domain of the resource. The initial number of resources in the target resource set can be $M_{total}$.

It should be noted that, in some embodiments, one resource may have one or more slots in the time domain and one or more sub-channels in the frequency domain. A sub-channel includes multiple PRBs. In other embodiments, one resource may have multiple slots in the time domain.

In this manner, the following two cases can be included.

In a first case, if the terminal sends data in slot a in the listening window without listening, the terminal determines whether the slot a+q×Prxlg overlaps with the resource R (x,y+j xPtxlg). If so, the resource R (x,y) is excluded from the resource set A. Where j may have a value selected from 0, 1, 2, 3 . . . C−1, and C may be determined based on a random counter value generated by the first terminal. The Ptxlg is a number of logical slots converted from the resource reservation period Prx of the first terminal. Prx is one of the resource reservation periods allowed by the resource pool. If Prx is less than Tscal and n minus a is less than or equal to Prxlg, Q can be rounded up by Tscal divided by Prx, otherwise Q is equal to 1. Tscal is a value in millisecond converted from T2.

The a second case, if the terminal detects the first sidelink control information transmitted in the PSCCH on a resource E (v, m) (v is the position in frequency domain of the resource) in the slot m within the listening window, the S-RSRP of the PSCCH or the S-RSRP of the PSSCH scheduled by the PSCCH (i.e. the S-RSRP of the corresponding PSSCH transmitted in the same slot as the PSCCH) is measured. If the measured S-RSRP is greater than the first S-RSRP threshold and periodic resource reservation is activated in the resource pool used by the first terminal, the first terminal may assume that the first sidelink control information received in m+q×Prxlg have the same content as that received in slot m. Where q can have a value selected from 1, 2, 3 . . . Q. For Q, if Prx is less than Tscal and n minus m is less than or equal to Prxlg, Q can be rounded up by Tscal divided by Prx, otherwise Q is equal to 1. Tscal is a value in millisecond converted from T2. The Prxlg is a number of logical slots converted from the resource reservation period Prx. The resource reservation period Prx may be the resource reservation period indicated by the Resource reservation period in the first sidelink control information transmitted in the PSCCH detected by the first terminal. The first terminal may determine whether the resources indicated by the Time resource assignment domain and the Frequency resource assignment domain of the Q pieces of the first sidelink control information supposedly received overlap with the resource R (x,y+j xPtxlg). If so, the corresponding resource R (x,y) is excluded from the set A. The first terminal may determine whether the resources indicated by the Time resource assignment (Time resource assignment) and the Frequency resource assignment (Frequency resource assignment) fields of the Q first sidelink control information supposedly received overlap with the resource R (x, y). Where j may have a value selected from 0, 1, 2, 3 . . . C−1, and C may be determined based on a random counter value generated by the first terminal. Ptxlg is a number of logical slots converted from the Ptx, and the Ptx is a resource reservation period determined by the first terminal performing resource selection. The first S-RSRP threshold may be determined by the priority P1 carried in the PSCCH detected by the first terminal and the priority P2 of the sidelink data to be sent by the terminal. The configuration of the resource pool used by the terminal may include an S-RSRP threshold list. The S-RSRP threshold list contains S-RSRP thresholds corresponding to all priority combinations. The configuration of resource pool can be network configuration or pre-configuration.

If the remaining resources in the target resource set after the above resource exclusion are less than $M_{total}×X$ %, then the first S-RSRP threshold value is raised by 3 dB to obtain the second S-RSRP threshold value, and then the two cases above are performed again, i.e., the resources that should be excluded from the target resource set are determined again according to the slot that is not being listened in the listening window and the position in time domain and frequency domain when the PSCCH is detected, until the remaining resources in the target resource set after the resource exclusion are greater than or equal to $M_{total}×X$ %. The possible values of X are {20, 35, 50}. The configuration of the resource pool used by the first terminal may include correspondences between the priority and the possible values of X. The first terminal determines the value of X according to the priority of the sidelink data to be sent and the correspondences. The X % described above may be the sixth value in the embodiments of the present disclosure.

In a case where the remaining resources in the target resource set after the resource exclusion are greater than or equal to $M_{total}×X$ %, the physical layer of the first terminal may take the remaining resources in the target resource set as the selected resource set A.

It should be noted that the embodiments of the present disclosure relates to multiple cases where resources are selected from the resource selection window. For example, the physical layer of the first terminal needs to determine a first resource set, and the first resource set is selected from the target resource selection window. For another example, the first terminal may select the candidate resource set from the first resource selection window. For another example, the first terminal may select the candidate resource set from the third resource selection window. For example, the first terminal may select the candidate resource set from the fourth resource selection window. In the implementation, the selection of resources from any of the above-mentioned resource selection windows may be performed by the physical layer of the first terminal.

In all of the four methods listed above for selecting resources from the resource selection window, the selection can be performed in a manner of the second resource selection mode. For example, if the specific resource selection window is the target resource selection window, the selected resource set may be the first resource set. For another example, if the specific resource selection window is the first resource selection window, the selected resource set may be a candidate resource set. For another example, if the specific resource selection window is a third resource selection window, the selected resource set may be a candidate resource set. For example, if the specific resource selection window is a fourth resource selection window, the selected resource set may be a candidate resource set.

It should be noted that any resource selection window in the embodiments of the present disclosure may include resources or resource sets within the selection window.

Figure 6:
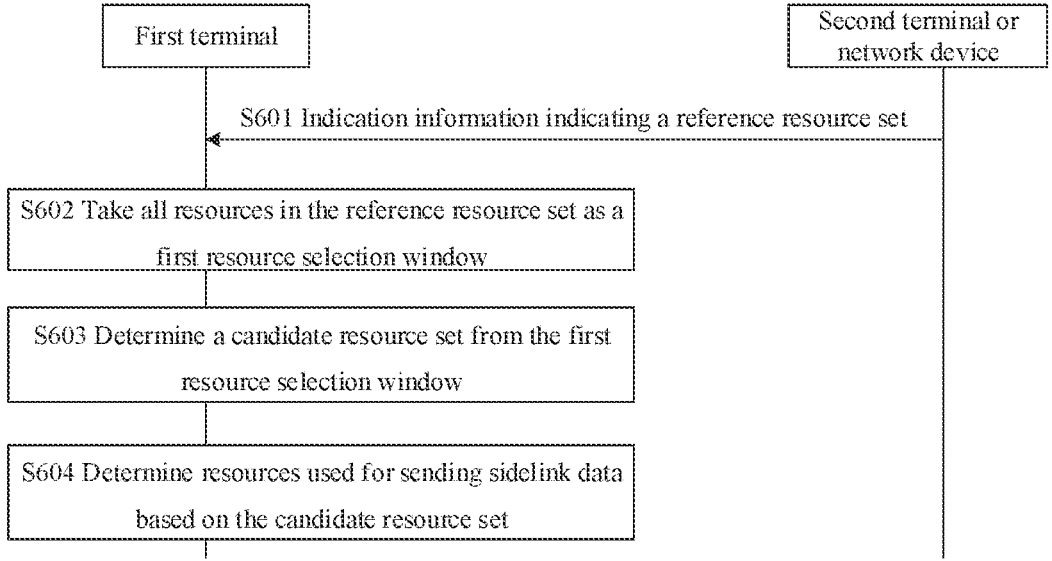
FIG. 6 is a flowchart of yet another method for resource determination according to an embodiment of the present disclosure.

FIG. 6 is a flowchart of yet another method for resource determination according to an embodiment of the present disclosure. As shown in FIG. 6, the method includes operations S601 to S604.

In operation S601, the second terminal or the network device sends indication information indicating a reference resource set to the first terminal, and the first terminal receives the indication information sent by the second terminal or the network device.

In some embodiments, it is assumed that the indication information is located in a slot r, a slot at which a first one of resources in the reference resource set is located is not before a first one of slots after a specific interval following after slot r.

The specific interval is determined based on a duration for the first terminal to decode the indication information and respond based on the indication information, and the specific interval is determined by a fixed setting, a network configuration, or a pre-configuration.

In some implementations, the specific interval may include an interval for decoding the indication information. In other implementations, the specific interval may include an n interval for decoding the indication information and responding based on the indication information. In still other implementations, the specific interval may include a sum of an interval for decoding the indication information and responding based on the indication information and an interval determined based on a subcarrier spacing. The interval determined based on the subcarrier spacing may be $T_{proc,1}$ as described above.

In operation S602, the first terminal takes all resources in the reference resource set as a first resource selection window.

For example, the time-frequency resources occupied by all resources in the reference resource set are identical to the time-frequency resources occupied by the first resource selection window.

In operation S603, the first terminal determines a candidate resource set from the first resource selection window.

After the first terminal determines the first resource selection window, the first terminal may determine, by adopting the second resource selection mode, the candidate resource set from the first resource selection window. In some feasible implementations, the number of resources in the candidate resource set finally determined by the first terminal may be equal to the number of resources in the reference resource set. The number of resources in the candidate resource set may be the number of all resources in the candidate resource set, and the number of resources in the reference resource set may be the number of all resources in the reference resource.

In operation S604, the first terminal determines, based on the candidate resource set, resources used for sending sidelink data.

In an embodiment of the present disclosure, the first terminal determines the candidate resource set from the reference resource set indicated by the second terminal or the network device, and then determines the resources used for sending the sidelink data based on the candidate resource set. Therefore, the first terminal can select the resources used for sending the sidelink data from the indicated reference resource set, thereby improving the reliability for the second terminal or the network device to receive the sidelink data.

In some embodiments, the first terminal may determine the candidate resource set based on the reference resource set, a resource selection window W used for determining the reference resource set, and a second resource selection window [n+T1, n+T2].

The second resource selection window is located between the first target slot and the second target slot. A slot value of the first target slot n+T1 is a sum of a slot value triggering a resource selection or a resource reselection and a second slot value. The second slot value is greater than or equal to 0 and less than or equal to the third slot value $T_{proc,1}$. The third slot value is determined based on the subcarrier spacing. A slot value of the second target slot n+T2 is a sum of the slot value triggering the resource selection or the resource reselection and the fourth slot value. The fourth slot value is greater than or equal to the fifth slot value and less than or equal to the residual delay budget of service. The fifth slot value is determined by the first terminal from a second value set based on a priority for sending the sidelink data. The fourth slot value may be the above T2, and the fifth time slot value may be the above $T2_{min}$.

Figure 7:
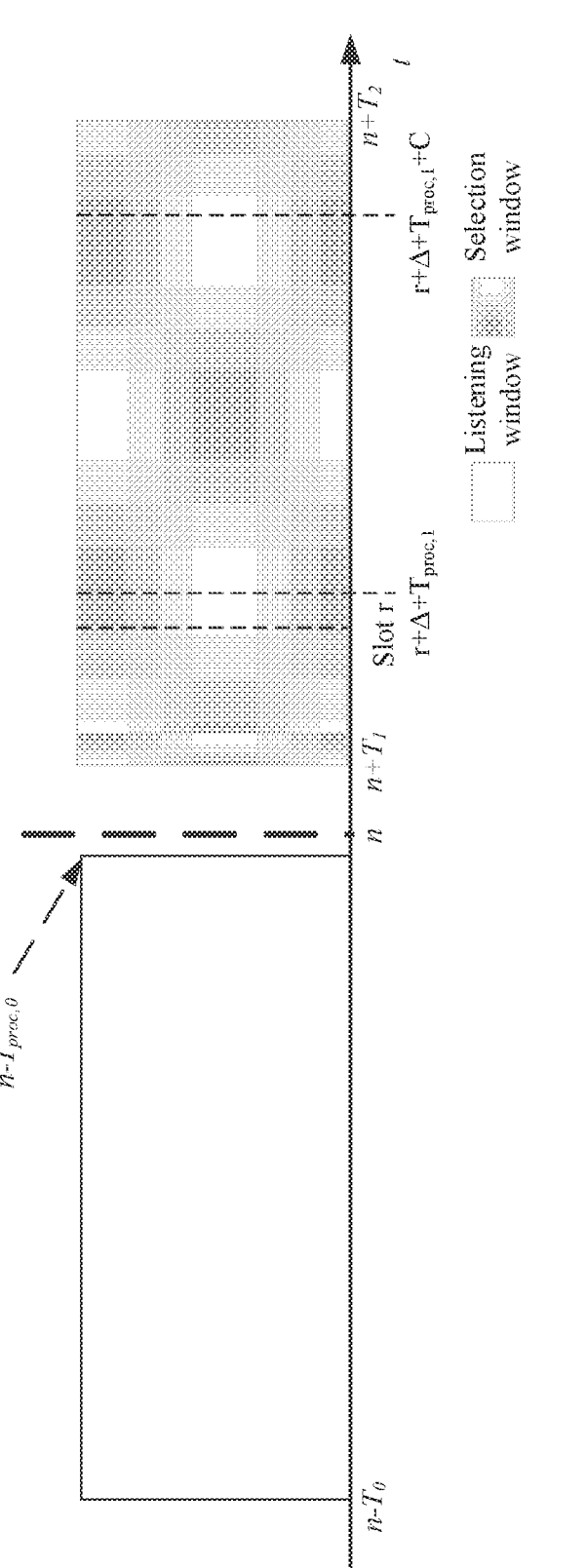
FIG. 7 is a schematic diagram of a listening window and a selection window according to an embodiment of the present disclosure.

FIG. 7 is a schematic diagram of a listening window and a selection window according to an embodiment of the present disclosure. As shown in FIG. 7, the first terminal triggers the resource selection or the resource reselection at slot n. The time domain of the listening window is between n−T0 and n−$T_{proc,0}$, and the first terminal can perform resource listening between n−T0 to n−$T_{proc,0}$. The second resource selection window may be resources between [n+T1, n+T2].

Figure 8:
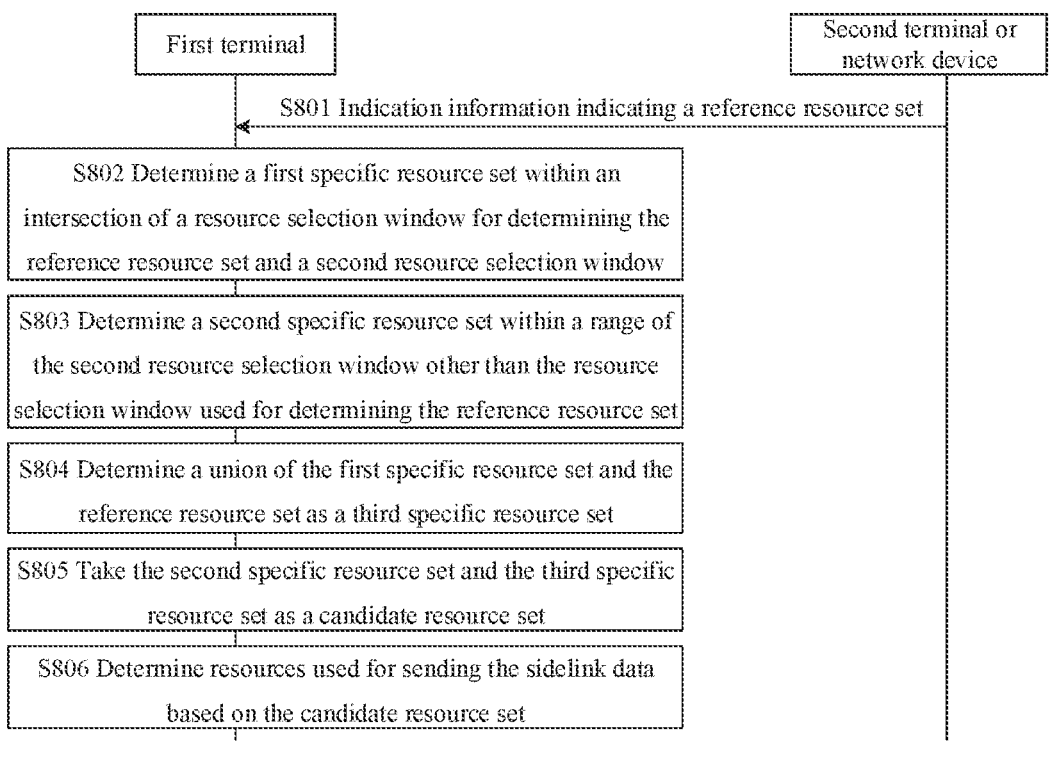
FIG. 8 is a flowchart of still another method for resource determination method according to an embodiment of the present disclosure.

FIG. 8 is a flowchart of still another method for resource determination according to an embodiment of the present disclosure. As shown in FIG. 8, the method includes operations S801 to S806.

In operation S801, the second terminal or the network device sends indication information indicating a reference resource set SC to the first terminal, and the first terminal receives the indication information sent by the second terminal or the network device.

In operation S802, the first terminal determines a first specific resource set within an intersection of a resource selection window for determining the reference resource set and a second resource selection window.

In operation S803, the first terminal determines a second specific resource set within a range of the second resource selection window other than the resource selection window used for determining the reference resource set.

In operation S804, the first terminal determines an intersection of the first specific resource set and the reference resource set as a third specific resource set.

In operation S805, the first terminal takes a union of the second specific resource set and the third specific resource set as the candidate resource set.

For example, the first terminal may determine a union of the second specific resource set and the third specific resource set as the candidate resource set.

In operation S806, the first terminal determines resources used for sending the sidelink data based on the candidate resource set.

In some implementations, the candidate resource set is determined based on a union of the third resource set A1, the fourth resource set (A2 ∩SC) and the fifth resource set A3. For example, the candidate resource set may be a union of the third resource set A1, and the fourth resource set (A2 ∩SC) and the fifth resource set A3.

The third resource set may be a resource set in a resource selection window between the first target slot and a slot corresponding to the first slot value r+Δ+$T_{proc,1}$. r is a slot at which the information indicating the SC is located, A indicates a duration for the terminal to decode the information indicating the SC and respond based on the information, and the value of Δ is defined by standard, configured by network or pre-configured.

The fourth resource set may be an intersection of the sixth resource set A2 and the reference resource set. The sixth resource set is a resource set in a resource selection window between the slot corresponding to the first slot value r+Δ+ $T_{proc,1}$ and a slot corresponding to a first smaller value. The first smaller value is a smaller value between the value of the second target slot n+T2 and a sum of the first slot value r+Δ+$T_{proc,1}$ and a duration of the resource selection window used for determining the reference resource set. The fifth resource set is a resource set in a resource selection window between a slot corresponding to the first smaller value and the second target slot. The first slot value is determined based on a value of a slot at which the first terminal receives the indication information.

It should be noted that in any implementation of the present disclosure, the duration of the resource selection window used for determining the reference resource set is determined based on one of: a fixed setting, a network configuration, or a pre-configuration; or by an indication of the first terminal within a specific range. In some implementations, a value of the fixed setting may be 96 ms.

In some implementations, as shown in FIG. 7 and FIG. 8, the candidate resource set may be A1∪(A2∩reference resource set)∪A3. A1 is a resource set determined by taking

[the first target slot n+T1, the slot $r+\Delta+T_{proc,1}$ corresponding to the first slot value] as a resource selection window. A2 is a resource set determined by taking [the slot $r+\Delta+T_{proc,1}$ corresponding to the first slot value, min $(r+\Delta+T_{proc,1}+C,$ second target slot n+T2)] as the resource selection window. A3 is a resource set determined by taking [min $(r+\Delta+T_{proc,1}+C,$ n+T2), n+T2] as the resource selection window. n is a time at which the first terminal triggers the resource selection or the resource reselection. C may be a duration for the second terminal or network device to determine the resource selection window of the SC, and a value of C may be defined by standard, network configuration, pre-configuration, or by an indication of the first terminal within a specific range. For example, C may be fixed to 96 ms. In case where min $(r+\Delta+T_{proc,1}+C,$ n+T2) is n+T2, A3 is an empty set.

Figure 9:
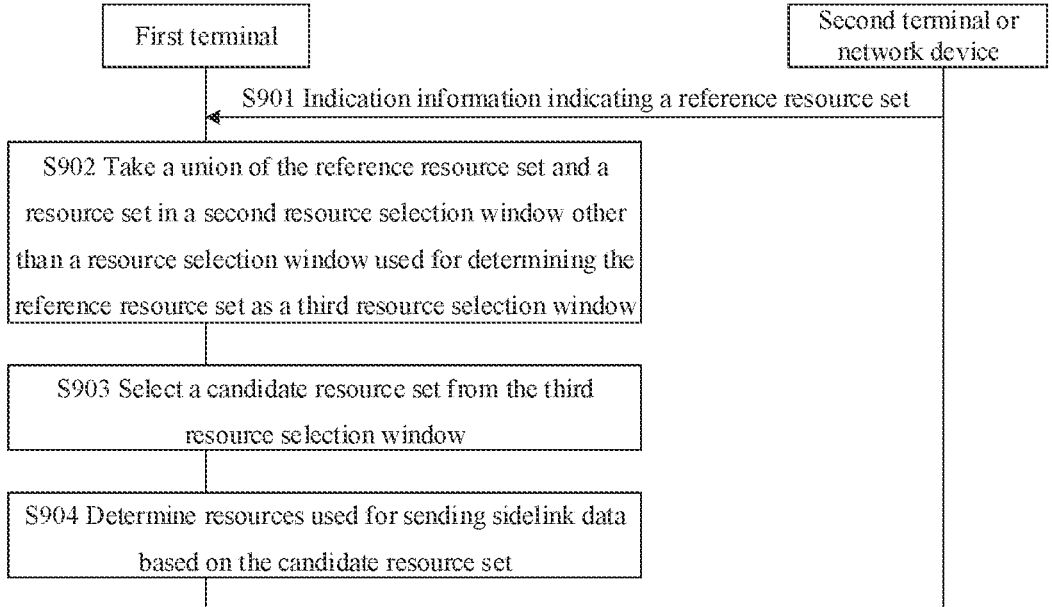
FIG. 9 is a flowchart of a method for resource determination method according to another embodiment of the present disclosure.

FIG. 9 is a flowchart of a method for resource determination method according to another embodiment of the present disclosure. As shown in FIG. 9, the method includes operations S901 to S904.

In operation S901, the second terminal or the network device sends indication information indicating a reference resource set SC to the first terminal, and the first terminal receives the indication information sent by the second terminal or the network device.

In operation S902, the first terminal takes a union of the reference resource set and a resource set in a second resource selection window other than a resource selection window used for determining the reference resource set as a third resource selection window.

In some implementations, the first terminal excludes resources in the second resource selection window [n+T1, n+T2] that overlap with the resource selection window W for determining the reference resource set, to obtain a remaining resource, and takes the union of the remaining resource and the reference resource set as the third resource selection window.

In operation S903, the first terminal selects the candidate resource set from the third resource selection window.

A manner for selecting the candidate resource from the third resource selection window can be: the candidate resource is selected from the third resource selection window by adopting the second resource selection mode. The description of the second resource selection mode is described in the above-mentioned embodiments and will not be described herein.

In operation S904, the first terminal determines resources used for sending sidelink data based on the candidate resource set.

In some implementations, the third resource selection window may be determined based on a union of the third resource set A1, the sixth resource set A2 and the fifth resource set A3. For example, in some embodiments, the third resource selection window may be a union of the third resource set A1, the sixth resource set A2 and the fifth resource set A3.

The third resource set A1 can be a resource set in a resource selection window between the first target slot and the slot corresponding to the first slot value $r+\Delta+T_{proc,1}$. The sixth resource set A2 may be a resource set in a resource selection window between the slot corresponding to the first time slot value $r+\Delta+T_{proc,1}$ and a slot corresponding to the first smaller value. The first smaller value is a smaller value between the value of the second target slot n+T2 and a sum of the first slot value $r+\Delta+T_{proc,1}$ and a duration of the resource selection window used for determining the reference resource set. The fifth resource set is a resource set in a resource selection window between a slot corresponding to the first smaller value and the second target slot. The first slot value is determined based on a value of a slot at which the first terminal receives the indication information.

In some implementations, as shown in FIG. 7 and FIG. 9, the first terminal may determine the third resource selection window as {all resources within a range of [n+T1, $r+\Delta+T_{proc,1}$]}∪{resources located within [$r+\Delta+T_{proc,1}$, min $((r+\Delta+T_{proc,1}+C,$ n+T2)]}∪{all resources within a range of [min $(r+\Delta+T_{proc,1}+C,$ n+T2), n+T2]}.

The embodiments corresponding to FIG. 10 to FIG. 14 explain the method for resource determination of the embodiments of the present disclosure by taking a case where the reference resource set includes resources unsuitable for the first terminal to send the sidelink data as an example.

Figure 10:
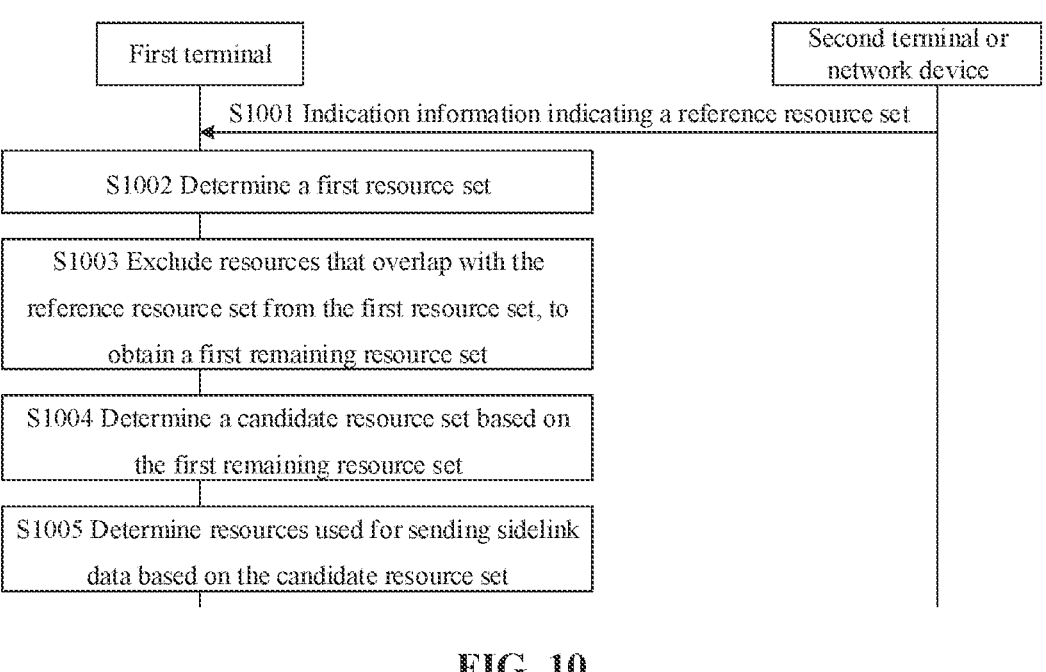
FIG. 10 is a flowchart of a method for resource determination according to yet another embodiment of the present disclosure.

FIG. 10 is a flowchart of a method for resource determination according to yet another embodiment of the present disclosure. As shown in FIG. 10, the method includes operations S1001 to S1005.

In operation S1001, the second terminal or the network device sends indication information indicating a reference resource set SC to the first terminal, and the first terminal receives the indication information sent by the second terminal or the network device.

In operation S1002, the first terminal determines a first resource set.

In operation S1003, the first terminal excludes resources that overlap with the reference resource set from the first resource set to obtain a first remaining resource set.

In operation S1004, the first terminal determines a candidate resource set based on the first remaining resource set.

In such implementation, the candidate resource set may be determined based on the first remaining resource set. The first remaining resource set is obtained by excluding resources that overlap with the reference resource set from a first resource set determined by the first terminal.

In some implementations, the embodiments corresponding to FIG. 10 may conform to a case where the physical layer of the first terminal determines the candidate resource set based on the reference resource set. For example, the physical layer of the first terminal determines a first resource set, the physical layer of the first terminal excludes resources that overlap with the reference resource set from the first resource set to obtain the first remaining resource set, and the physical layer of the first terminal determines the candidate resource set based on the first remaining resource set. The embodiments corresponding to FIG. 10 can also conform to a case where the physical layer of the first terminal determines a first resource set and uploads the first resource set to the MAC layer of the first terminal, and the MAC layer determines the candidate resource set based on the reference resource set and the first resource set. For example, the MAC layer of the first terminal excludes the resources that overlap with the reference resource set from the first resource set to obtain a first remaining resource set; and determines the candidate resource set based on the first remaining resource set.

In some implementations, the first terminal may take the first remaining resource set as the candidate resource set.

In some implementations, the operation that the candidate resource set is determined based on the first remaining resource may include: in a case where a number of resources in the first remaining resource set is greater than or equal to a second threshold $M_{total} \times Y3$, the first remaining resource set is taken as the candidate resource set.

The second threshold value $M_{total} \times Y3$ is a product of an initial number of resources $M_{total}$ in an available resource set of a resource pool used by the first terminal and a fourth value Y3. The fourth value Y3 is determined by a fixed setting, a network configuration, or a pre-configuration. In some embodiments, in a case where a number of resources in the first remaining resource set is less than the second threshold $M_{total} \times Y3$, the first resource set is taken as the candidate resource set.

In operation S1005, resources used for sending sidelink data are determined based on the candidate resource set.

Figure 11:
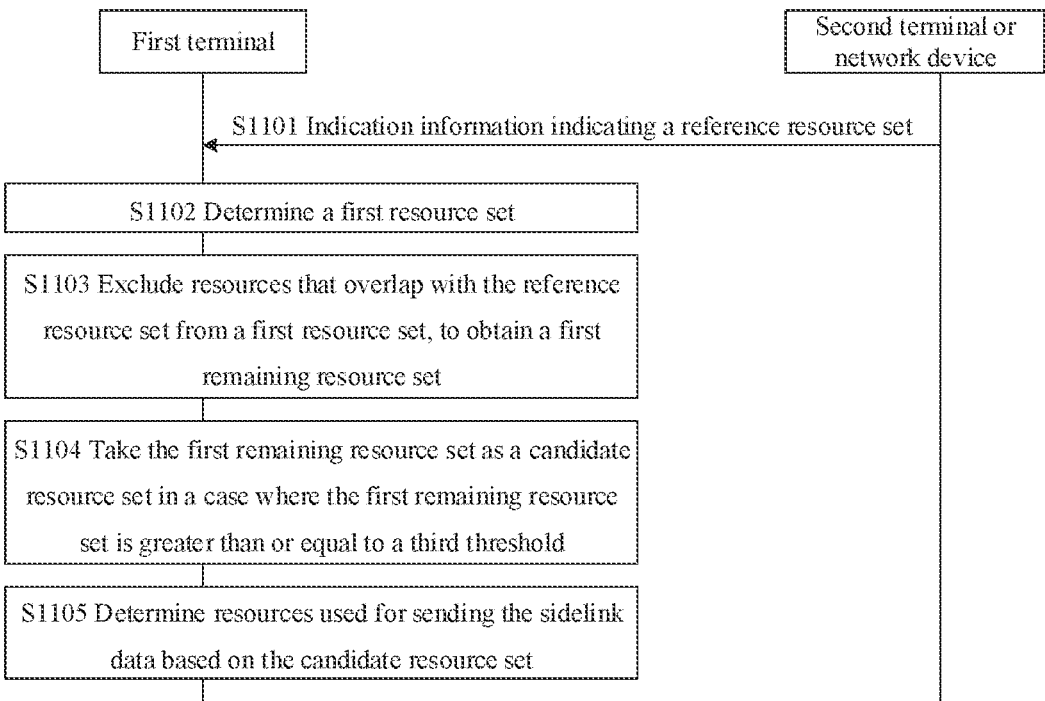
FIG. 11 is a flowchart of a method for resource determination according to still another embodiment of the present disclosure.

FIG. 11 is a flowchart of a method for resource determination according to still another embodiment of the present disclosure. As shown in FIG. 11, the method includes operations S1101 to S1105.

In operations S1101, the second terminal or the network device sends indication information indicating a reference resource set SC to the first terminal, and the first terminal receives the indication information sent by the second terminal or the network device.

In operation S1102, the first terminal determines a first resource set.

In operation S1103, the first terminal excludes resources that overlap with the reference resource set from a first resource set to obtain a first remaining resource set.

In operation S1104, in a case where the first remaining resource set is greater than or equal to a third threshold, the first remaining resource set is taken as the candidate resource set.

Conversely, in a case where the first remaining resource set is less than the third threshold, a first RSRP threshold used for determining the first resource set is raised by 3 dB, and operations S1102, S1103, and S1104 are performed again.

The third threshold value $M_{total} \times Y4$ is a product of an initial number $M_{total}$ of resources in an available resource set of a resource pool used by the first terminal and a fifth value Y4.

The fifth value Y4 is determined by one of: a fixed setting, a network configuration, or a pre-configuration.

In some implementations, the embodiments corresponding to FIG. 11 may conform to a case where the physical layer of the first terminal determine the first resource set; excludes resources that overlap with the reference resource set from the first resource set to obtain a first remaining resource set; and takes the first remaining resource set as the candidate resource set in a case where the first remaining resource set is greater than or equal to a third threshold. The embodiments corresponding to FIG. 11 can also conform to a case where the physical layer of the first terminal determines the first resource set and uploads the first resource set to the MAC layer of the first terminal; the MAC layer excludes resources that overlap with the reference resource set from the first resource set to obtain a first remaining resource set; and the MAC layer takes the first remaining resource set as the candidate resource set in a case where the first remaining resource set is greater than or equal to a third threshold. The MAC layer determines the resources used for sending the sidelink data based on the candidate resource set.

In operation S1105, the first terminal determines resources used for sending the sidelink data based on the candidate resource set.

In the corresponding embodiments of FIGS. 10 and 11, resources included in the reference resource set and resources included in the first resource set have a same or different size in frequency domain.

In some embodiments, the operation that the first terminal determines the candidate resource set based on the reference resource set may include: a fourth resource selection window is determined based on the reference resource set; and the candidate resource set is selected from the fourth resource selection window. Such an implementation may correspond to the embodiments of FIG. 12 and FIG. 14 of the present disclosure. The operation that the candidate resource set is selected from the fourth resource selection window may be performed by adopting the second resource selection mode.

Figures 12, 13:
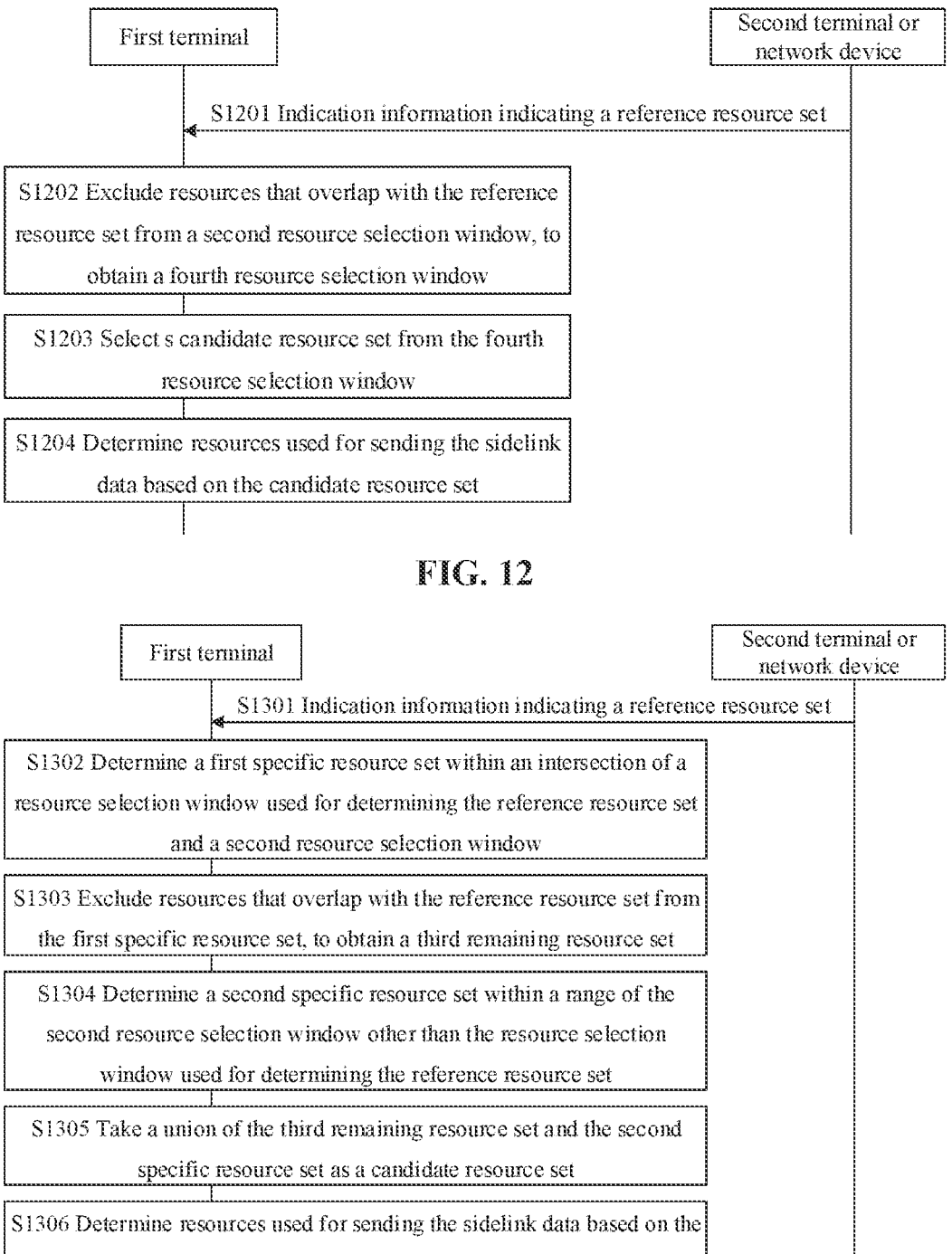
FIG. 12 is a flowchart of another method for resource determination method according to another embodiment of the present disclosure.
FIG. 13 is a flowchart of yet another method for resource determination method according to another embodiment of the present disclosure.

FIG. 12 is a flowchart of another method for resource determination method according to another embodiment of the present disclosure. As shown in FIG. 12, the method includes operations S1201 to S1204.

In operation S1201, the first terminal receives indication information indicating a reference resource set sent by the second terminal or the network device.

In operation S1202, the first terminal excludes resources that overlap with the reference resource set from the second resource selection window, to obtain the fourth resource selection window.

The second resource selection window is located between a first target slot and a second target slot.

A value of the first target slot n+T1 is a sum of a value of a slot to trigger resource selection or resource reselection and a second slot value, where the second slot value is greater than or equal to 0 and less than or equal to a third slot value $T_{proc,1}$, and the third slot value is determined based on a subcarrier spacing.

A value of the second target slot n+T2 is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data.

In operation S1203, the first terminal selects the candidate resource set from the fourth resource selection window.

In some implementations, the first terminal may select the candidate resource set from the fourth resource selection window according to the second resource selection mode.

In operation S1204, the first terminal determines resources used for sending the sidelink data based on the candidate resource set.

FIG. 13 is a flowchart of yet another method for resource determination method according to another embodiment of the present disclosure. As shown in FIG. 13, the method includes operations S1301 to S1306.

In operation S1301, the second terminal or the network device sends indication information indicating a reference resource set to the first terminal, and the first terminal receives the indication information sent by the second terminal or the network device.

In operation S1302, the first terminal determines a first specific resource set within an intersection of the resource selection window used for determining the reference resource set and the second resource selection window.

In operation S1303, the first terminal excludes resources that overlap with the reference resource set from the first specific resource set, to obtain a third remaining resource set.

In operation S1304, the first terminal determines a second specific resource set within a range of the second resource selection window other than the resource selection window used for determining the reference resource set.

In operation S1305, the first terminal takes a union of the third remaining resource set and the second specific resource set as the candidate resource set.

In operation S1306, the first terminal determines resources used for sending the sidelink data based on the candidate resource set.

In some embodiments, the candidate resource set is determined based on a union of a third resource set A1, a seventh resource set and a fifth resource set A3. For example, the candidate resource set may be the union of the third resource set A1, the seventh resource set and the fifth resource set A3.

The third resource set is a resource set in a resource selection window between the first target slot and a slot corresponding to a first slot value $r+\Delta+T_{proc,1}$. The seventh resource set is a resource set of resources within the sixth resource set A2 and non-overlapping with the reference resource set, where the sixth resource set A2 is a resource set in a resource selection window between the slot corresponding to the first slot value $r+\Delta+T_{proc,1}$ and a slot corresponding to a first smaller value, where the first smaller value is a smaller value between the value of the second target slot $n+T2$ and a sum of the first slot value $r+\Delta+T_{proc,1}$ and a duration of the resource selection window used for determining the reference resource set. The fifth resource set is a resource set in a resource selection window between a slot corresponding to the first smaller value and the second target slot. A value of the first target slot $n+T1$ is a sum of a value of a slot to trigger resource selection or resource reselection and a second slot value, where the second slot value is greater than or equal to 0 and less than or equal to a third slot value $T_{proc,1}$ and the third slot value is determined based on a subcarrier spacing.

A value of the second target slot $n+T2$ is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data.

The first slot value is determined based on a value of a slot at which the first terminal receives the indication information.

In some implementations, the candidate resource set may be $A1 \cup$(resources in A2 that do not overlap completely with resources in the candidate resource set SC)$\cup A3$. A1 is a resource set determined by taking $[n+T1, r+\Delta+T_{proc,1}]$ as the resource selection window. A2 is a resource set determined by taking $[r+\Delta+T_{proc,1}, \min (r+\Delta+T_{proc,1}+C, +C, n+T2)]$ as the resource selection window. A3 a resource set determined by taking $[\min (r+\Delta+T_{proc,1}+C, n+T2), n+T2]$ as the resource selection window. n is a time at which the first terminal triggers the resource selection or the resource reselection. C may be a duration for the second terminal or network device to determine the resource selection window of the SC, and a value of C may be defined by standard, network configuration, pre-configuration, or by an indication of the first terminal within a specific range. For example, C may be fixed to 96 ms.

Figures 14, 15:
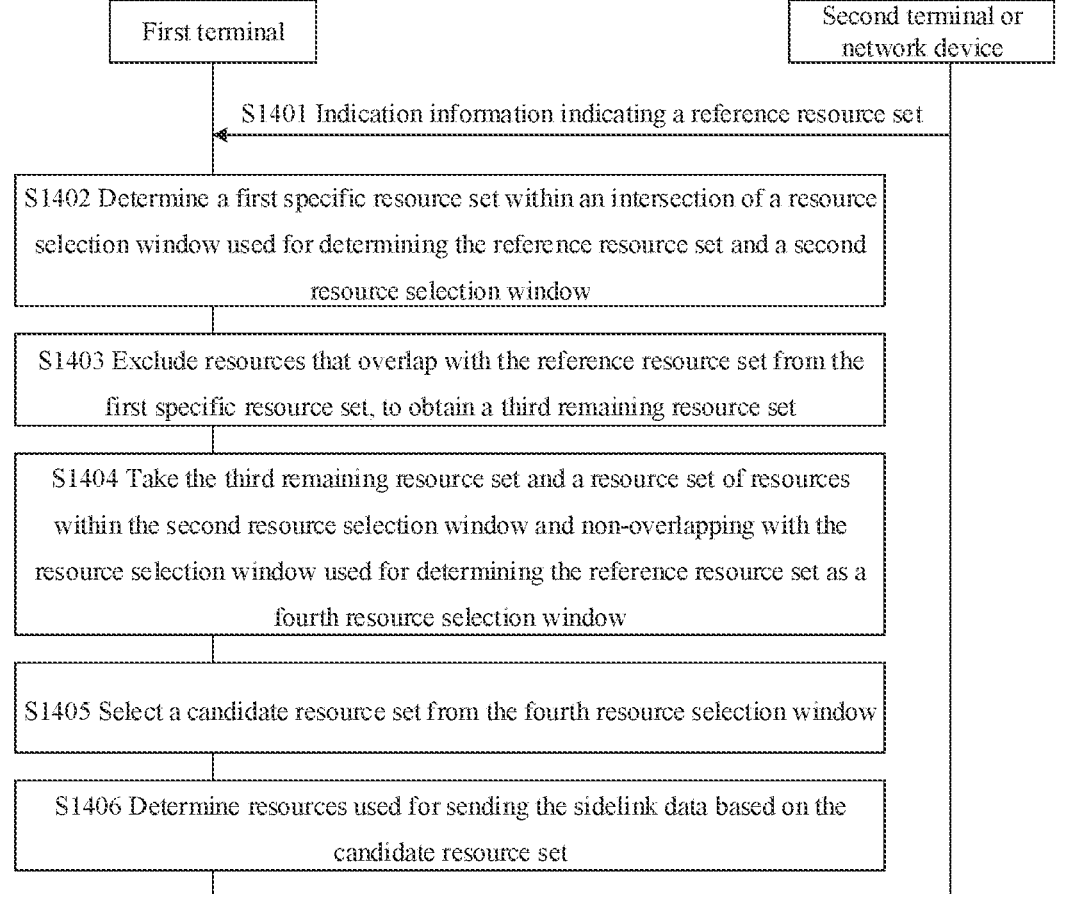
FIG. 14 is a flowchart of still another method for resource determination according to another embodiment of the present disclosure.
FIG. 15 is a schematic structural diagram of an apparatus for resource determination according to an embodiment of the present disclosure.

FIG. 14 is a flowchart of still another method for resource determination according to another embodiment of the present disclosure. As shown in FIG. 14, the method includes operations 1401 to 1406.

In operation S1401, the second terminal or the network device sends indication information indicating a reference resource set to the first terminal, and the first terminal receives the indication information sent by the second terminal or the network device.

In operation S1402, the first terminal determines a first specific resource set within an intersection of a resource selection window used for determining the reference resource set and the second resource selection window.

In operation S1403, the first terminal excludes resources that overlap with the reference resource set from the first specific resource set, to obtain a third remaining resource set.

In operation S1404, the first terminal takes the third remaining resource set and a resource set of resources within the second resource selection window and non-overlapping with the resource selection window used for determining the reference resource set as the fourth resource selection window.

In some implementations, the fourth resource selection window may be determined based on a union of the third resource set A1, the seventh resource set and the fifth resource set A3. For example, the fourth resource selection window may be a union of the third resource set A1, the seventh resource set and the fifth resource set A3.

The third resource set is a resource set in a resource selection window between the first target slot and a slot corresponding to a first slot value $r+\Delta+T_{proc,1}$. The seventh resource set is a resource set of resources within the sixth resource set A2 and non-overlapping with the reference resource set, where the sixth resource set is a resource set in a resource selection window between the slot corresponding to the first slot value $r+\Delta+T_{proc,1}$ and a slot corresponding to a first smaller value, where the first smaller value is a smaller value between the value of the second target slot $n+T2$ and a sum of the first slot value $r+\Delta+T_{proc,1}$ and a duration of the resource selection window used for determining the reference resource set. The fifth resource set is a resource set in a resource selection window between a slot corresponding to the first smaller value and the second target slot. A value of the first target slot $n+T1$ is a sum of a value of a slot to trigger resource selection or resource reselection and a second slot value, where the second slot value is greater than or equal to 0 and less than or equal to a third slot value $T_{proc,1}$, and the third slot value is determined based on a subcarrier spacing.

A value of the second target slot $n+T2$ is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data. The first slot value is determined based on a value of a slot at which the first terminal receives the indication information.

In some implementations, the first terminal determines a resource selection window as {all resources in a range of $[n+T1, r+\Delta+T_{proc,1}]$}$\cup${resources in the range of $[r+\Delta+ T_{proc,1} \min (r+\Delta+T_{proc,1}+C, n+T2)]$ that do not overlap with resources in SC}$\cup$all resources in a range of $\{[\min (r+\Delta+ T_{proc,1}+C, n+T2]\}$. Within the determined resource selection window, the first terminal may determine the candidate resource set according to the second resource selection mode.

In operation S1405, the first terminal selects the candidate resource set from the fourth resource selection window.

In operation S1406, the first terminal determines resources used for sending the sidelink data based on the candidate resource set.

In some embodiments, the resource pool used for determining the reference resource set, the resource pool used for determining the candidate resource set, and the resource pool used for determining the first resource set are identical.

In some embodiments, a number of sub-channels included in each resource in the first resource set, a number of sub-channels included in each resource in the reference resource set, and a number of sub-channels included in each resource in the candidate resource set are identical.

Several implementations for determining the resources used for sending the sidelink data based on the candidate resource set are described below.

In the following implementations, the first terminal may determine the candidate set by using any of the above methods.

In the following implementations, the determination of the candidate resource set may be performed by the physical layer of the first terminal. The physical layer of the first terminal may upload the determined candidate resource set to the MAC layer of the first terminal. In other implementations, the determination of the candidate resource set may be performed by the MAC layer of the first terminal.

In the implementation, the MAC layer of the first terminal may perform the operation of determining the resources used for sending the sidelink data.

In some embodiments, the first terminal receives the indication information indicating the reference resource set. The first terminal may determine the candidate resource set based on the reference resource set. The first terminal may randomly select the resources used for sending the sidelink data from the candidate resource set.

In other embodiments, the first terminal receives the indication information indicating the reference resource set. The first terminal may determine the candidate resource set based on the reference resource set. In a case where the candidate resource set has a set of Q resources or multiple sets of Q resources and an interval between any two of the set of Q resources or any set of the multiple sets of Q resources is greater than or equal to a specific slot value Z and less than or equal to 32, the set of Q resources or the any set of the multiple sets of Q resources is taken as the resources used for sending the sidelink data. Q is a number of resources determined by the first terminal to send one or more Transport Blocks (TBs).

In the implementation process, the specific slot value is a sum of a first interval and a second interval. The first interval includes an interval between an end of a last one of Orthogonal Frequency Division Multiplexing (OFDM) symbols used by the first terminal to send a PSSCH and a first one of symbols of a Physical Sidelink Feedback Channel (PSFCH) corresponding to the PSSCH. The second interval includes an interval for receiving the PSFCH, preparing for retransmission of data, and transmit-receive conversion.

In the implementation, the first interval may be determined by the minimum interval sl-MinTimeGapPSFCH between the PSSCH configured in the resource pool and the PSFCH associated therewith and the configuration period sl-PSFCH-Period of the PSFCH in the resource pool.

In other embodiments, the first terminal receives the indication information indicating the reference resource set. The first terminal may determine the candidate resource set based on the reference resource set. The first terminal can randomly select resources from a first resource set based on the candidate resource set to obtain the resources used for sending the sidelink data. The resources used for sending the sidelink data includes: Q resources used for sending one or more TBs. At least R of the Q resources belong to the candidate resource set. R is a value obtained by upward rounding or downward rounding of a product of Q and a fifth value Y5, where the fifth value Y5 is greater than 0 and less than or equal to 1, and the fifth value Y5 is determined by a fixed setting, a network configuration, or a pre-configuration.

In still other embodiments, the first terminal receives the indication information indicating the reference resource set. The first terminal may determine a candidate resource set based on the reference resource set. The first terminal can randomly select resources from a first resource set based on the candidate resource set to obtain the resources used for sending the sidelink data. The resources used for sending the sidelink data includes: Q resources used for sending one or more TBs. The resource used for initial transmission among the Q resources belongs to the candidate resource set.

The embodiments of the disclosure provide a method for a terminal to select resources according to the reference resource set. According to the method proposed herein, the first terminal may determine the reference resource set according to the indication information indicating the reference resource set sent by the second terminal or the network device; the physical layer of the first terminal can then determine the candidate resource set to be reported to the MAC according to the SC, where the candidate resource set can be the intersection of the resource set determined by the first terminal according to the second resource selection mode and the reference resource set, or the resources in the resource set determined by the first terminal according to the second resource selection mode that does not overlap with the resource in the reference resource set, or a resource set, determined according to the second resource selection mode, in the resource selection window determined according to the reference resource set; and finally the first terminal physical layer reports the determined candidate resource set to the MAC layer of the first terminal to enable the MAC layer to select resources from the determined candidate resource set. Optionally, the first terminal determines the reference resource set according to the indication information indicating the reference resource set sent by the second terminal or the network device; then the MAC layer of the first terminal directly determines the candidate resource set according to the reference resource set and the first resource set reported by the physical layer of the first terminal according to the second resource selection mode; and finally, the MAC layer of the first terminal selects resources within the candidate resource set. According to the method provided by the embodiments of the disclosure, the second terminal or the network device can be prevented from selecting resources unsuitable for receiving at the receiving end, thereby effectively improving the overall performance of the sidelink communication.

According to the embodiments of the present disclosure, based on the resource listening adopted by the second resource selection mode, a manner that one terminal (second terminal or network equipment) sends the reference resource set to another terminal (first terminal) can assist the first terminal in resource selection. The second terminal or the network device may determines the reference resource set according to the resource interception result performed by or available resource set obtained by the indication of the base station or the like. or detected SCI sidelink link control information. The reference resource set can be a resource set suitable for the first terminal. When the first terminal selects the resources used for sending sidelink data to the target receiving terminal, the resource can be preferentially selected from the available resource set, thereby improving the reliability for the target receiving terminal to receive the sidelink data. Optionally, the resource set may be a resource set unsuitable for the first terminal to use, and the first terminal avoids selecting the resources in the resource set when selecting resources, thereby avoiding problems such as hiding terminals, half duplex restrictions, exposing terminals and the like. A terminal undertaking the functions of the second terminal or network device is called a resource coordination terminal. And in some of the above embodiments, the second terminal or the network device does not need to listen when selecting the candidate resource set, thereby reducing the power consumption of the second terminal or the network device.

Compared with the method in which the terminal autonomously selects the transmission resource by using the second resource selection mode in the related technology, according to the resource allocation method of the embodiments of the present disclosure, the terminal selects the resource in combination with the reference resource set sent by other terminals during the resource selection process, thereby improving the transmission reliability.

Based on the foregoing embodiments, embodiments of the present disclosure provide a device for resource determination. All units and all modules included in the device for resource determination can be implemented by a processor in apparatus for resource determination. Of course, all units and all modules can also be implemented by specific logic circuits.

FIG. 15 is a schematic structural diagram of an apparatus for resource determination according to an embodiment of the present disclosure. As shown in FIG. 15, the apparatus for resource determination 1500 includes a receiving unit 1501, a determining unit 1502 and a sending unit 1503.

The receiving unit 1501 is configured for the first terminal to receive indication information indicating a reference resource set. The determining unit 1502 is configured to determine a candidate resource set based on the reference resource set; and determine resources used for sending sidelink data based on the candidate resource set.

In some embodiments, a resource pool used for determining the reference resource set is identical to a resource pool used for determining the candidate resource set.

In some embodiments, the receiving unit 1501 is further configured for the first terminal to receive the indication information sent by the second terminal or the network device. The apparatus for resource determination 1500 further includes a sending unit 1503 configured to send first high-layer information or first physical layer information to the second terminal or the network device. The first high-layer information or the first physical layer information indicates at least one of: a size in frequency domain of resources included in the reference resource set, or configuration information of the resource pool used for determining the reference resource set.

In some embodiments, the determining unit 1502 is further configured for the physical layer of the first terminal to receive the indication information. The physical layer of the first terminal determines a candidate resource set based on the reference resource set. The physical layer reports the candidate resource set to the MAC layer of the first terminal. The MAC layer determines the resources used for sending the sidelink data based on the candidate resource set.

In some embodiments, the determining unit 1502 is further configured for the physical layer of the first terminal to determine a first resource set and upload the first resource set to the MAC layer of the first terminal. The MAC layer determines the candidate resource set based on the reference resource set and the first resource set. The MAC layer determines the resource used for sending the sidelink data based on the candidate resource set.

In some embodiments, the candidate resource set is determined based on an intersection of the first resource set determined by the first terminal and the reference resource set.

In some embodiments, the receiving unit 1501 is further configured for the first terminal to receive the indication information sent by the second terminal or the network device. A number of resources included in the reference resource set is greater than or equal to a product of a first value and a second value, the first value being a total number of resources in a resource selection window used by the second terminal to determine the reference resource set. The second value being greater than 0 and less than or equal to 1, and the second value being determined by a fixed setting, a network configuration, or a pre-configuration; or by an indication of the first terminal, from one or more target values through second high-layer information or second physical layer information, where the one or more target values are determined by a fixed setting, a network configuration or a pre-configuration.

In some embodiments, the sending unit 1503 is further configured for the first terminal to send third high-layer information or third physical layer information to the second terminal. The third high-layer information or the third physical layer information indicates a time starting position of the resource selection window used for determining the reference resource set.

In some embodiments, the resource selection window used for determining the reference resource set is determined by the second terminal based on at least one of: a time at which trigger information sent by the first terminal is received, or specific information included in the trigger information.

In some embodiments, in a case where the intersection of the first resource set and the reference resource set is greater than or equal to a first threshold, the determining unit 1502 is further configured to take the intersection of the first resource set and the reference resource set as the candidate resource set. The first threshold is a product of an initial number of resources in an available resource set of a resource pool used by the first terminal and a third value, the third value is greater than 0 and less than or equal to 1, and the third value is determined by the first terminal from a first value set based on a priority for sending the sidelink data.

In some embodiments, in a case where the intersection of the first resource set and the reference resource set is less than the first threshold, a first Reference Signal Received Power (RSRP) threshold used for determining the first resource set is raised to a second RSRP threshold. A second resource set is determined based on the second RSRP threshold. In a case where an intersection of the second resource set and the reference resource set is greater than or equal to the first threshold, the intersection of the second resource set and the reference resource set is taken as the candidate resource set.

In some embodiments, resources included in the reference resource set, resources included in the candidate resource set, and resources included in the first resource set have a same size in frequency domain.

In some embodiments, the determining unit 1502 is further configured to take all resources in the reference resource set as a first resource selection window, and select the candidate resource set from the first resource selection window.

In some embodiments, a slot corresponding to a first one of the resources in the reference resource set is not before a first one of slots after a specific interval following a slot corresponding to a first slot value. The first slot value is determined based on a value of a slot at which the first terminal receives the indication information. The specific interval is determined based on a duration for the first terminal to decode the indication information and respond based on the indication information, and the specific interval is determined by a fixed setting, a network configuration, or a pre-configuration.

In some embodiments, the determining unit 1502 is further configured to determine the candidate resource set based on the reference resource set, a resource selection window used for determining the reference resource set, and a second resource selection window. The second resource selection window is located between a first target slot and a second target slot. A value of the first target slot is a sum of a value of a slot to trigger resource selection or resource reselection and a second slot value, where the second slot value is greater than or equal to 0 and less than or equal to a third slot value, and the third slot value is determined based on a subcarrier spacing. A value of the second target slot is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data.

In some embodiments, the determining unit 1502 is further configured to determine a first specific resource within the intersection of the resource selection window for determining the reference resource set and the second resource selection window; determine a first specific resource set within a range of an intersection of the resource selection window used for determining the reference resource set and the second resource selection window; determine a second specific resource set within a range of the second resource selection window other than the resource selection window used for determining the reference resource set; determine a union of the first specific resource set and the reference resource set as a third specific resource set; and take the second specific resource set and the third specific resource set as the candidate resource set.

In some embodiments, the candidate resource set is determined based on a union of a third resource set, a fourth resource set, and a fifth resource set. The third resource set is a resource set in a resource selection window between the first target slot and a slot corresponding to a first slot value. The fourth resource set is an intersection of a sixth resource set and the reference resource set. The sixth resource set is a resource set in a resource selection window between the slot corresponding to the first slot value and a slot corresponding to a first smaller value, where the first smaller value is a smaller value between the value of the second target slot and a sum of the first slot value and a duration of the resource selection window used for determining the reference resource set. The fifth resource set is a resource set in a resource selection window between a slot corresponding to the first smaller value and the second target slot. The first slot value is determined based on a value of a slot at which the first terminal receives the indication information.

In some embodiments, the determining unit 1502 is further configured to take a union of the reference resource set and a resource set in the second resource selection window other than the resource selection window used for determining the reference resource set as a third resource selection window; and select the candidate resource set from the third resource selection window.

In some embodiments, the third resource selection window is determined based on a union of a third resource set, a sixth resource set, and a fifth resource set. The third resource set is a resource set in a resource selection window between the first target slot and a slot corresponding to a first slot value. The sixth resource set is a resource set in a resource selection window between the slot corresponding to the first slot value and a slot corresponding to a first smaller value, where the first smaller value is a smaller value between the value of the second target slot and a sum of the first slot value and a duration of the resource selection window used for determining the reference resource set. The fifth resource set is a resource set in a resource selection window between a slot corresponding to the first smaller value and the second target slot. The first slot value is determined based on a value of a slot at which the first terminal receives the indication information.

In some embodiments, the candidate resource set is determined based on a first remaining resource set. The first remaining resource set is obtained by excluding resources that overlap with the reference resource set from a first resource set determined by the first terminal.

In some embodiments, the determining unit 1502 is further configured to take the first remaining resource set as the candidate resource set in a case where a number of resources in the first remaining resource set is greater than or equal to a second threshold. The second threshold is a product of an initial number of resources in an available resource set of a resource pool used by the first terminal and a fourth value, and the fourth value is determined by a fixed setting, a network configuration, or a pre-configuration.

In some embodiments, the determining unit 1502 is further configured to take the first resource set as the candidate resource set in a case where a number of resources in the first remaining resource set is less than the second threshold.

In some embodiments, the determining unit 1502 is further configured to determine a first resource set; exclude resources that overlap with the reference resource set from the first resource set, to obtain a first remaining resource set; in a case where the first remaining resource set is greater than or equal to a third threshold, take the first remaining resource set as the candidate resource set. The third threshold value is a product of an initial number of resources in an available resource set of a resource pool used by the first terminal and a fifth value, and the fifth value is determined by a fixed setting, a network configuration, or a pre-configuration.

In some embodiments, the determining unit 1502 is further configured to raise a first RSRP threshold used for determining the first resource set to a second RSRP threshold in a case where the first remaining resource set is less than the third threshold; determine a second resource set based on the second RSRP threshold; exclude resources that overlap with the reference resource set from the second resource set, to obtain a second remaining resource set; and in a case where the second remaining resource set is greater than or equal to the third threshold, take the second remaining resource set as the candidate resource set.

In some embodiments, a size in frequency domain of resources included in the reference resource set is different from a size in frequency domain of resources included in the first resource set.

In some embodiments, the determining unit 1502 is further configured to determine a fourth resource selection window based on the reference resource set.

The determining unit 1502 is further configured to select the candidate resource set from the fourth resource selection window.

In some embodiments the determining unit 1502 is further configured to exclude resources that overlap with the reference resource set from the second resource selection window, to obtain the fourth resource selection window. The second resource selection window is located between a first target slot and a second target slot. A value of the first target slot is a sum of a value of a slot to trigger resource selection or resource reselection and a second slot value, where the second slot value is greater than or equal to 0 and less than or equal to a third slot value, and the third slot value is determined based on a subcarrier spacing. A value of the second target slot is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data.

In some embodiments, the determining unit 1502 is further configured to determine a first specific resource set within an intersection of the resource selection window used for determining the reference resource set and the second resource selection window; exclude resources that overlap with the reference resource set from the first specific resource set, to obtain a third remaining resource set; determine a second specific resource set within a range of the second resource selection window other than the resource selection window used for determining the reference resource set; and take a union of the third remaining resource set and the second specific resource set as the candidate resource set.

In some embodiments, the candidate resource set is determined based on a union of a third resource set, a seventh resource set, and a fifth resource set. The third resource set is a resource set in a resource selection window between the first target slot and a slot corresponding to a first slot value. The seventh resource set is a resource set of resources within the sixth resource set and non-overlapping with the reference resource set, where the sixth resource set is a resource set in a resource selection window between the slot corresponding to the first slot value and a slot corresponding to a first smaller value, where the first smaller value is a smaller value between the value of the second target slot and a sum of the first slot value and a duration of the resource selection window used for determining the reference resource set. The fifth resource set is a resource set in a resource selection window between a slot corresponding to the first smaller value and the second target slot. A value of the first target slot is a sum of a value of a slot to trigger resource selection or resource reselection and a second slot value, where the second slot value is greater than or equal to 0 and less than or equal to a third slot value, and the third slot value is determined based on a subcarrier spacing; A value of the second target slot is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data. The first slot value is determined based on a value of a slot at which the first terminal receives the indication information.

In some embodiments, the determining unit 1502 is further configured to determine a first specific resource set within an intersection of a resource selection window used for determining the reference resource set and the second resource selection window; exclude resources that overlap with the reference resource set from the first specific resource set, to obtain a third remaining resource set; and take the third remaining resource set and a resource set of resources within the second resource selection window and non-overlapping with the resource selection window used for determining the reference resource set as the fourth resource selection window.

In some embodiments, the fourth resource selection window is determined based on a union of a third resource set, a seventh resource set, and a fifth resource set. The third resource set is a resource set in a resource selection window between the first target slot and a slot corresponding to a first slot value. The seventh resource set is a resource set of resources within the sixth resource set and non-overlapping with the reference resource set, where the sixth resource set is a resource set in a resource selection window between the slot corresponding to the first slot value and a slot corresponding to a first smaller value, where the first smaller value is a smaller value between the value of the second target slot and a sum of the first slot value and a duration of the resource selection window used for determining the reference resource set. The fifth resource set is a resource set in a resource selection window between a slot corresponding to the first smaller value and the second target slot. A value of the first target slot is a sum of a value of a slot to trigger resource selection or resource reselection and a second slot value, where the second slot value is greater than or equal to 0 and less than or equal to a third slot value, and the third slot value is determined based on a subcarrier spacing. A value of the second target slot is a sum of a value of a slot to trigger the resource selection or the resource reselection and a fourth slot value, where the fourth slot value is greater than or equal to a fifth slot value and less than or equal to a remaining delay budget value of a service, and the fifth slot value is determined by the first terminal from a second value set based on a priority for sending the sidelink data. The first slot value is determined based on a value of a slot at which the first terminal receives the indication information.

In some embodiments, the duration of the resource selection window used for determining the reference resource set is determined based on a fixed setting, a network configuration, or a pre-configuration; or by an indication of the first terminal within a specific range.

In some embodiments, the reference resource set includes resources suitable for the first terminal to send the sidelink data.

In some embodiments, a size in frequency domain of resources included in the reference resource set is identical to a size in frequency domain of resources included in the candidate resource set.

In some embodiments, the reference resource set includes resources that are not suitable for the first terminal to send the sidelink data.

In some embodiments, a size in frequency domain of resources included in the reference resource set is one or more sub-channels. The size in frequency domain of resources included in the reference resource set is different from a size in frequency domain of resources included in the candidate resource set.

In some embodiments, a resource pool used for determining the reference resource set, a resource pool used for determining the candidate resource set, and a resource pool used for determining the first resource set are identical.

In some embodiments, a number of sub-channels included in each resource in the first resource set, a number of sub-channels included in each resource in the reference resource set, and a number of sub-channels included in each resource in the candidate resource set are identical.

In some embodiments, the determining unit 1502 is further configured to determine an eighth resource set and a ninth resource set.

The determining unit 1502 is further configured to take an intersection of the eighth resource set and the ninth resource set as the first resource set. The eighth resource set is determined based on a third target slot at which data is transmitted within a listening window and no listening is performed, and the ninth resource set is determined based on a detected PSCCH.

In some embodiments, the determining unit 1502 is further configured to, in a case where the data is sent at the third target slot in the listening window and no listening is performed at the third target slot, exclude resources corresponding to the third target slot from a target resource selection window to obtain the eighth resource set.

In some embodiments, the determining unit 1502 is further configured to determine, in the target resource selection window, a fourth target slot corresponding to the third target slot based on a resource reservation period; and exclude all resources in the fourth target slot.

In some embodiments, the determining unit 1502 is further configured to measuring a RSRP of the PSCCH or a RSRP of a PSSCH scheduled by the PSCCH in a case where a PSCCH is detected in the listening window; in a case where the RSRP of the PSCCH or the RSRP of the PSSCH scheduled by the PSCCH is greater than a first RSRP threshold and a periodic resource reservation is activated for a reserved resource in the target resource selection window or in a resource pool used by the first terminal, exclude the reserved resource from the target resource selection window to obtain fifth remaining resources; and in a case where an intersection of the fifth remaining resources and the eighth resource set is greater than or equal to a product of an available resource set of the resource pool used by the first terminal and a sixth value, take the fifth remaining resources as the ninth resource set.

In some embodiments, the determining unit 1502 is further configured to, in a case where the intersection of the fifth remaining resources and the eighth resource set is less than the product of the available resource set and the sixth value, raise the first RSRP threshold to a second RSRP threshold; in a case where the RSRP of the PSCCH or the RSRP of the PSSCH scheduled by the PSCCH is greater than the second RSRP threshold and the periodic resource reservation is activated for the reserved resource in the target resource selection window or in the resource pool used by the first terminal, exclude the reserved resource from the target resource selection window to obtain sixth remaining resources; and in a case where an intersection of the sixth remaining resources and the eighth resource set is greater than or equal to a product of the available resource set and the sixth value, take the sixth remaining resources as the ninth resource set.

In some embodiments, the determining unit 1502 is further configured to randomly select the resources used for sending the sidelink data from the candidate resource set.

In some embodiments, the determining unit 1502 is further configured to, in a case where the candidate resource set has a set of Q resources or multiple sets of Q resources and an interval between any two of the set of Q resources or any set of the multiple sets of Q resources is greater than or equal to a specific slot value and less than or equal to 32, take the set of Q resources or the any set of the multiple sets of Q resources as the resources used for sending the sidelink data. Q is a number of resources determined by the first terminal to send one or more Transport Blocks (TBs).

In some embodiments, the specific slot value is a sum of a first interval and a second interval. The first interval includes an interval between an end of a last one of Orthogonal Frequency Division Multiplexing (OFDM) symbols used by the first terminal to send a PSSCH and a first one of symbols of a Physical Sidelink Feedback Channel (PSFCH) corresponding to the PSSCH. The second interval includes an interval for receiving the PSFCH, preparing for retransmission of data, and transmit-receive conversion.

In some embodiments the determining unit 1502 is further configured to randomly select resources from a first resource set based on the candidate resource set to obtain the resources used for sending the sidelink data. The resources used for sending the sidelink data includes: Q resources used for sending one or more TBs. At least R of the Q resources belong to the candidate resource set. R is a value obtained by upward rounding or downward rounding of a product of Q and a fifth value, where the fifth value is greater than 0 and less than or equal to 1, and the fifth value is determined by a fixed setting, a network configuration, or a pre-configuration.

In some embodiments, the determining unit 1502 is further configured to randomly select resources from a first resource set based on the candidate resource set to obtain the resources used for sending the sidelink data. The resources used for sending the sidelink data includes: Q resources used for sending one or more TBs. A resource used for initial transmission among the Q resources belongs to the candidate resource set.

Figure 16:
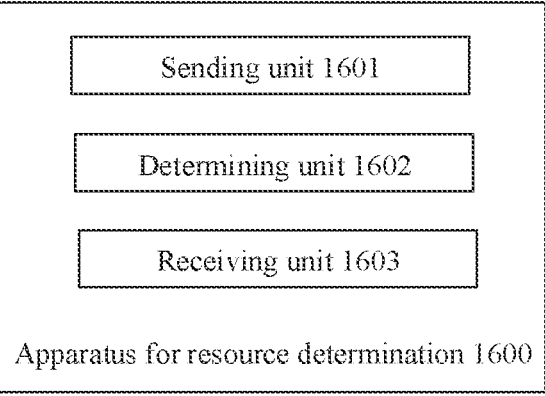
FIG. 16 is a schematic structural diagram of another apparatus for resource determination according to an embodiment of the present disclosure.

FIG. 16 is a schematic structural diagram of another apparatus for resource determination according to an embodiment of the present disclosure. As shown in FIG. 16, the apparatus for resource determination 1600 includes: a sending unit 1601 configured for a second terminal to send indication information indicating a reference resource set to the first terminal. The reference resource set is used for the first terminal to determine a candidate resource set based on the reference resource set, and determine resources used for sending sidelink data based on the candidate resource set.

In some embodiments, the apparatus for resource determination 1600 may further include a determining unit 1602 for the second terminal to determine a reference resource set and determine indication information based on the reference resource set.

In some embodiments, the apparatus for resource determination 1600 further includes a receiving unit 1603 configured to receive the first high-layer information or the first physical layer information sent by the first terminal. The first high-layer information or the first physical layer information indicates at least one of: a size in frequency domain of resources included in the reference resource set, or configuration information of the resource pool used for determining the reference resource set.

In some embodiments, the receiving unit 1603 is further configured to receive third high-layer information or third physical layer information sent by the first terminal. The third high-layer information or the third physical layer information indicates a time starting position of the resource selection window used for determining the reference resource set.

In some embodiments, the receiving unit 1603 is further configured to receive trigger information sent by the first terminal; and determine the resource selection window used for determining the reference resource set based on at least one of: a time at which trigger information sent by the first terminal is received, or specific information included in the trigger information.

The description of the above device embodiments is similar to the description of the above method embodiments and has the same beneficial effect as the method embodiments. Technical details not disclosed in the device embodiments of the present disclosure are understood with reference to the description of the method embodiments of the present disclosure.

It should be noted that, if the method for resource determination in sidelink communication is implemented in the form of a software function unit and sold or used as an independent product, it can be stored in a computer readable storage medium. Based on such understanding, the technical solution of the present disclosure, in essence or in the form of a software product, which is stored in a storage medium, includes several instructions for making a first terminal device/the second terminal device to perform all or part of the steps of the method according to each embodiment of the present disclosure. The aforementioned storage media include: U disk, mobile hard disk, read-only memory (ROM), random access memory (RAM), disk or optical disk and other media that can store program code. Thus embodiments of the present disclosure are not limited to any particular combination of hardware and software.

Figure 17:
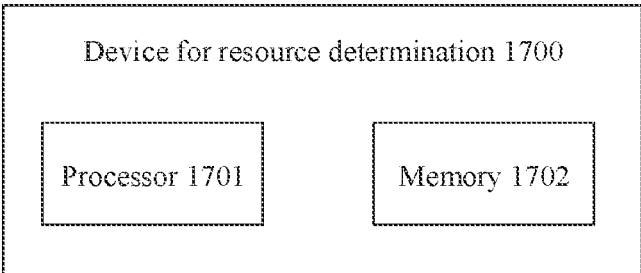
FIG. 17 is a schematic diagram of a hardware entity of a device for resource determination according to an embodiment of the present disclosure.

FIG. 17 is a schematic diagram of a hardware entity of a device for resource determination according to an embodiment of the present disclosure. As shown in FIG. 17, the hardware entity of the device for resource determination 1700 includes a processor 1701 and a memory 1702. The memory 1702 stores computer programs executable on the processor 1701. The operations in the method performed by the first terminal or the second terminal of any of the above embodiments are implemented when the processor 1701 executes the programs. The apparatus for resource determination in the embodiments of the present disclosure may be a first terminal or a second terminal in any of the above embodiments.

Embodiments of the present disclosure provide a computer storage medium having stored thereon one or more programs that, where the one or more programs executable by one or more processors to implement operations of the method in any of the above embodiments.

Figure 18:
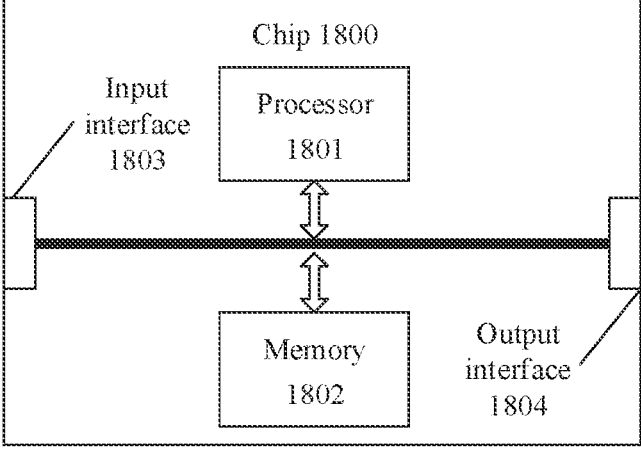
FIG. 18 is a schematic structural diagram of a chip according to an embodiment of the present disclosure.

FIG. 18 is a schematic structural diagram of a chip according to an embodiment of the present disclosure. The chip 1800 shown in FIG. 18 includes a processor 1801 configured to invoke and run computer programs from a memory to cause a device on which the chip is mounted to implement operations of the method performed by the first terminal/second terminal in embodiments of the present disclosure.

In some embodiments, as shown in FIG. 18, the chip 1800 may also include a memory 1802. The processor 1801 may invoke and run computer programs from the memory 1802 to implement the operations of the method performed by the first terminal/second terminal in embodiments of the present disclosure.

The memory 1802 may be a separate device independent of or integrated into the processor 1801.

In some embodiments, the chip 1800 may also include an input interface 1803. The processor 1801 may control the input interface 1803 to communicate with other devices or chips and in particular may obtain information or data sent by other devices or chips.

In some embodiments, the chip 1800 may also include an output interface 1804. The processor 1801 may control the output interface 1804 to communicate with other devices or chips and in particular may output information or data to other devices or chips.

In some embodiments, the chip can be applied to the first terminal/second terminal in the embodiments of the present disclosure, and the chip can realize the corresponding process realized by the first terminal/second terminal in each method of the embodiments of the disclosure. For the sake of brevity, it will not be elaborated herein. It should be understood that the chips referred to in embodiments of the present disclosure may also be called as system-on-chip or system-on-chip or the like.

Embodiments of the disclosure provide a computer program product. The computer program product includes a computer storage medium for storing computer program codes. The computer program codes include instructions executable by at least one processor, the operations of the method performed by the first terminal/second terminal of the method described above can be implemented when the instructions are executed by the at least one processor. In some implementations, the computer program product may be applied to the first terminal/second terminal in the embodiments of the present disclosure, and the computer program instructions cause the computer to execute the corresponding flow performed by the first terminal/second terminal in the various methods of the embodiments of the present disclosure, which will not be repeated herein for the sake of brevity.

It is to be understood that the processor of the embodiment of the present disclosure may be an integrated circuit chip with signal processing capability. In the implementation process, each step of the above method embodiment can be completed by the instruction in the form of integrated logic circuit of hardware or software in the processor. The above processors can be general purpose processors, digital signal processors (DSPS), application specific integrated circuits (ASICs), field programmable gate arrays (FPGAs) or other programmable logic devices, discrete gate or transistor logic devices, and discrete hardware components. The disclosed methods, steps and logic block diagrams in the embodiments of the present disclosure can be implemented or executed. The general-purpose processor may be a microprocessor or the processor may be any conventional processor or the like. The steps of the method disclosed in connection with the embodiment of the present disclosure can be directly embodied in the execution completion of the hardware decoding processor, or by the combination of the hardware and software modules in the decoding processor. The software module can be located in random memory, flash memory, read-only memory, programmable read-only memory or electrically erasable programmable memory, register and other mature storage media in the art. The storage medium is located in the memory, and the processor reads the information in the memory and completes the steps of the above method in combination with its hardware.

It is to be understood that the memory in the embodiments of the present disclosure may be volatile memory or non-volatile memory, or may include both volatile and non-volatile memory. The nonvolatile memory can be read-only memory (ROM), programmable ROM (PROM), erasable Prom (EPROM), electrically erasable EPROM (EEPROM) or flash memory. Volatile memory can be random access memory (RAM), which is used as an external cache. Many forms of RAM are available, such as static RAM (SRAM), dynamic RAM (DRAM), synchronous DRAM (SDRAM), double data rate SDRAM (DDR SDRAM, enhanced SDRAM (ESDRAM), synchlink DRAM (SLDRAM) and direct Rambus RAM (DR RAM). It is to be noted that the memory of the systems and methods described herein is intended to include, but is not limited to, these and any other suitable types of memory.

It should be noted here that the above descriptions of storage medium embodiment, computer program embodiment, chip embodiment and computer program product embodiment is similar to that of the above method embodiment, and has a beneficial effect similar to that of the method embodiment. For technical details not disclosed in the storage medium embodiments and the device embodiments of the present application, reference is made to the description of the method embodiments of the present application.

It should be noted that the indication information, any high-layer information, MAC layer information, physical layer information and trigger information in the embodiments of the present disclosure can be respectively indication signaling, high-layer signaling, MAC layer signaling, physical layer signaling and trigger signaling.

It should be understood that reference throughout the specification to "one embodiment" or "an embodiment" means that a particular feature, structure, or characteristic associated with the embodiment is included in at least one embodiment of the present disclosure. Thus, the appearances of & "in one embodiment" or "in an embodiment" in various places throughout the specification do not necessarily refer to the same embodiment. Furthermore, these specific features, structures, or characteristics may be combined in any suitable manner in one or more embodiments. It is to be understood that, in the various embodiments of the present disclosure, the magnitude of the sequence numbers of the processes described above is not meant to mean the order of execution, and the order of execution of the processes should be determined by their function and intrinsic logic, and should not be construed as any limitation on the implementation of the embodiments of the present disclosure. The above-described embodiment numbers of the present disclosure are for description only and do not represent the advantages or disadvantages of the embodiments.

Unless specifically described, the first terminal/second terminal performs any operation in the embodiments of the present disclosure, which may be performed by the processor of the first terminal/second terminal. Unless otherwise specified, embodiments of the present disclosure are not limited to the sequence in which the first terminal/second terminal performs the following steps. In addition, the manner in which the data is processed in different embodiments may be the same method or different methods. It should also be noted that any operation in the embodiments of the present disclosure can be independently performed by the first terminal/the second terminal, that is, when the first terminal/the second terminal performs any operation in the following embodiments, it cannot depend on the execution of other steps.

In several embodiments provided by the present disclosure, it should be understood that the disclosed first terminal device/second device and methods can be realized in other ways. For example, the embodiment of the device described above is only schematic. For example, the division of the unit is only a logical function division, and there can be another division method in actual implementation, for example, multiple units or components can be combined or integrated into another system, or some features can be ignored or not implemented. On the other hand, the mutual coupling or direct coupling or communication connection illustrated or discussed can be indirect coupling or communication connection through some interfaces, devices or units, and can be electric, mechanical or other forms. It will be appreciated by those of ordinary skill in the art that all or a portion of the operations of the above-described method embodiments may be implemented by means of hardware associated with program instructions. The above-described program may be stored in a computer-readable storage medium. The program, when executed, performs the operations of the above-described method embodiments. The storage medium includes a removable storage device, a Read Only Memory (ROM), a magnetic disk, or an optical disk and other media that can store program codes.

The methods disclosed in the method embodiments provided in this disclosure can be arbitrarily combined without conflict to obtain new method embodiments. The features disclosed in the product embodiments provided in this disclosure can be arbitrarily combined without conflict to obtain new product embodiments. The features disclosed in the method or first terminal/second terminal embodiments provided in this disclosure can be arbitrarily combined without conflict to obtain new method embodiments or first terminal/second terminal embodiments.

Alternatively, the integrated unit described above may be stored in a computer-readable storage medium if implemented as a software functional module and sold or used as an independent product. Based on such an understanding, the technical solution of the embodiments of the present disclosure, in essence or in part contributing to the related art, may be embodied in the form of a software product, which is stored in a storage medium, includes instructions for causing a video coding apparatus to perform all or part of the methods described in the various embodiments of the present disclosure. The aforementioned storage media include: U disk, mobile hard disk, read-only memory (ROM), random access memory (RAM), disk or optical disk and other media that can store program code.

The above is only the specific embodiments of the disclosure, but the scope of protection of the disclosure is not limited to this. Any person skilled in the technical field who can easily think of change or replacement within the technical scope of the disclosure shall be covered in the scope of protection of the disclosure. Therefore, the protection scope of the disclosure shall be subject to the protection scope of the claims.

INDUSTRIAL PRACTICALITY

The embodiments of the disclosure provide methods, devices and apparatus for resource determination, a storage medium, a chip and a program product. With the method for resource determination in the present disclosure, the first terminal can determine resources used for sending the sidelink data based on the indicated reference resource set when selecting the resource used for sending the sidelink data, thereby improving the reliability of the sidelink data transmission.

The invention claimed is:

1. A method for resource determination, comprising:
   receiving, by a first terminal, indication information from a second terminal or a network device, the indication information indicating a reference resource set;

determining a candidate resource set based on the reference resource set; and determining resources used for sending sidelink data based on the candidate resource set;

wherein determining the candidate resource set based on the reference resource set comprises:

determining a first resource set;

excluding resources that overlap with the reference resource set from the first resource set, to obtain a first remaining resource set;

in response to determining that a number of resources in the first remaining resource set is greater than or equal to a third threshold, taking the first remaining resource set as the candidate resource set, wherein the third threshold is a product of an initial number of resources in an available resource set of a resource pool used by the first terminal and a fifth value, the fifth value is determined by a fixed setting, a network configuration, or a pre-configuration;

wherein the method further comprises:

sending, by the first terminal, first high-layer information or first physical layer information to the second terminal or the network device, wherein the first high-layer information or the first physical layer information indicates at least one of: a size in frequency domain of resources included in the reference resource set, or configuration information of a resource pool used for determining the reference resource set.

2. The method of claim 1, wherein the resource pool used for determining the reference resource set is identical to a resource pool used for determining the candidate resource set.

3. The method of claim 1, wherein a physical layer of the first terminal receives the indication information;

the physical layer of the first terminal determines the candidate resource set based on the reference resource set; and the method further comprises: reporting, by the physical layer, the candidate resource set to a Media Access Control (MAC) layer of the first terminal; and determining, by the MAC layer, the resources used for sending the sidelink data based on the candidate resource set.

4. The method of claim 1, further comprising:

determining, by a physical layer of the first terminal, the first resource set, and uploading, by the physical layer, the first resource set to an MAC layer of the first terminal;

determining, by the MAC layer, the candidate resource set based on the reference resource set and the first resource set; and determining, by the MAC layer, the resources used for sending the sidelink data based on the candidate resource set.

5. The method of claim 1, further comprising:

in response to determining that the number of resources in the first remaining resource set is less than the third threshold, raising a first RSRP threshold used for determining the first resource set to a second RSRP threshold;

determining a second resource set based on the second RSRP threshold;

excluding resources that overlap with the reference resource set from the second resource set, to obtain a second remaining resource set; and in response to determining that a number of resources in the second remaining resource set is greater than or equal to the third threshold, taking the second remaining resource set as the candidate resource set.

6. The method of claim 1, wherein the size in frequency domain of resources included in the reference resource set is different from a size in frequency domain of resources included in the first resource set, wherein the reference resource set comprises resources that are not suitable for the first terminal to send the sidelink data, wherein the size in frequency domain of resources included in the reference resource set is one or more sub-channels; and the size in frequency domain of resources included in the reference resource set is different from a size in frequency domain of resources included in the candidate resource set.

7. The method of claim 4, wherein the resource pool used for determining the reference resource set, a resource pool used for determining the candidate resource set, and a resource pool used for determining the first resource set are identical, wherein a number of sub-channels included in each resource in the first resource set, a number of sub-channels included in each resource in the reference resource set, and a number of sub-channels included in each resource in the candidate resource set are identical, wherein the method further comprising:

determining an eighth resource set and a ninth resource set;

taking an intersection of the eighth resource set and the ninth resource set as the first resource set, wherein the eighth resource set is determined based on a third target slot at which data is transmitted within a listening window and no listening is performed, and the ninth resource set is determined based on a detected Physical Sidelink Control Channel (PSCCH).

8. The method of claim 7, wherein determining the eighth resource set comprises:

in response to determining that the data is sent at the third target slot in the listening window and no listening is performed at the third target slot, excluding resources corresponding to the third target slot from a target resource selection window to obtain the eighth resource set, wherein excluding the resources corresponding to the third target slot from the target resource selection window comprises:

determining, in the target resource selection window, a fourth target slot corresponding to the third target slot based on a resource reservation period; and excluding all resources in the fourth target slot.

9. The method of claim 7, wherein determining the ninth resource set comprises:

in response to determining that a PSCCH is detected in the listening window, measuring a RSRP of the PSCCH or a RSRP of a Physical Sidelink Shared Channel (PSSCH) scheduled by the PSCCH;

in response to determining that the RSRP of the PSCCH or the RSRP of the PSSCH scheduled by the PSCCH is greater than a first RSRP threshold and a periodic resource reservation is activated for a reserved resource in the target resource selection window or in a resource pool used by the first terminal, excluding the reserved resource from the target resource selection window to obtain fifth remaining resources; and in response to determining that an intersection of the fifth remaining resources and the eighth resource set is greater than or equal to a product of an available resource set of the resource pool used by the first terminal and a sixth value, taking the fifth remaining resources as the ninth resource set.

10. The method of claim 9, further comprising:

in response to determining that the intersection of the fifth remaining resources and the eighth resource set is less than the product of the available resource set and the sixth value, raising the first RSRP threshold to a second RSRP threshold;

in response to determining that the RSRP of the PSCCH or the RSRP of the PSSCH scheduled by the PSCCH is greater than the second RSRP threshold and the periodic resource reservation is activated for the reserved resource in the target resource selection window or in the resource pool used by the first terminal, excluding the reserved resource from the target resource selection window to obtain sixth remaining resources; and in response to determining that an intersection of the sixth remaining resources and the eighth resource set is greater than or equal to a product of the available resource set and the sixth value, taking the sixth remaining resources as the ninth resource set.

11. A method for resource determination, comprising:

sending, by a second terminal, indication information to a first terminal, the indication information indicating a reference resource set to the first terminal, wherein the reference resource set is used for determining a candidate resource set and determining resources used for transmission of sidelink data; and receiving, by the second terminal, the sidelink data that is sent by the first terminal on the resources based on the candidate resource set;

wherein resources that overlap with the reference resource set from a first resource set determined by the first terminal are excluded, to obtain a first remaining resource set; in response to a number of resources in the first remaining resource set being determined to be greater than or equal to a third threshold, the first remaining resource set is taken as the candidate resource set, the third threshold is a product of an initial number of resources in an available resource set of a resource pool used by the first terminal and a fifth value, and the fifth value is determined by a fixed setting, a network configuration, or a pre-configuration;

wherein the method further comprises:

receiving, by the second terminal, first high-layer information or first physical layer information sent by the first terminal, wherein the first high-layer information or the first physical layer information indicates at least one of: a size in frequency domain of resources included in the reference resource set, or configuration information of the resource pool used for determining the reference resource set.

12. A device for resource determination, comprising:

a processor, and a memory storing a computer program executable by the processor, wherein the processor is configured to perform operations of:

receiving indication information from a second terminal or a network device, the indication information indicating a reference resource set;

determining a candidate resource set based on the reference resource set; and determining resources used for sending sidelink data based on the candidate resource set;

wherein determining the candidate resource set based on the reference resource set comprises:

determining a first resource set;

excluding resources that overlap with the reference resource set from the first resource set, to obtain a first remaining resource set;

in response to determining that a number of resources in the first remaining resource set is greater than or equal to a third threshold, taking the first remaining resource set as the candidate resource set, wherein the third threshold is a product of an initial number of resources in an available resource set of a resource pool used by the first terminal and a fifth value, the fifth value is determined by a fixed setting, a network configuration, or a pre-configuration;

wherein the processor is further configured to perform operations of:

sending first high-layer information or first physical layer information to the second terminal or the network device, wherein the first high-layer information or the first physical layer information indicates at least one of: a size in frequency domain of resources included in the reference resource set, or configuration information of the resource pool used for determining the reference resource set.

\* \* \* \* \*